(12) United States Patent
Lin

(10) Patent No.: US 9,394,706 B2
(45) Date of Patent: Jul. 19, 2016

(54) CONCRETE ANCHOR

(71) Applicant: Simpson Strong-Tie Company, Inc., Pleasanton, CA (US)

(72) Inventor: Jin-Jie Lin, Livermore, CA (US)

(73) Assignee: Simpson Strong-Tie Company, Inc., Pleasanton, CA (US)

(*) Notice: Subject to any disclaimer, the term of this patent is extended or adjusted under 35 U.S.C. 154(b) by 0 days.

(21) Appl. No.: 14/510,035

(22) Filed: Oct. 8, 2014

(65) Prior Publication Data

US 2015/0096242 A1 Apr. 9, 2015

Related U.S. Application Data

(60) Provisional application No. 61/887,977, filed on Oct. 8, 2013.

(51) Int. Cl.
*E04G 21/14* (2006.01)
*E04G 15/04* (2006.01)
(Continued)

(52) U.S. Cl.
CPC . *E04G 15/04* (2013.01); *E04B 9/18* (2013.01); *E04G 21/185* (2013.01)

(58) Field of Classification Search
CPC ....... E04C 5/08; E04G 21/142; E04G 21/185; E04G 15/04
USPC ........... 52/125.5, 698–701, 704–709, 745.21, 52/223.6, 223.13, 39, 125.1, 125.2, 125.4, 52/126.7; 411/267
See application file for complete search history.

(56) References Cited

U.S. PATENT DOCUMENTS

| 179,994 A | 7/1876 | Brallier |
| 487,721 A | 12/1891 | De Kalb |

(Continued)

FOREIGN PATENT DOCUMENTS

| CA | 2313735 A1 | 3/2001 |
| CA | 2364582 | 2/2010 |

(Continued)

OTHER PUBLICATIONS

McGraw-Hill Book Company, Inc. "Product Engineering Design Manual" edited by Douglas C. Greenwood, copyright 1959, 29 pages, title and copyright page, pp. 90-97, p. 316-329, New York, USA.

(Continued)

*Primary Examiner* — Beth Stephan
(74) *Attorney, Agent, or Firm* — James R. Cypher; Charles R. Cypher

(57) ABSTRACT

An anchor particularly adapted to be embedded into a concrete construction for suspension of a ceiling panel, duct or the like, includes a base which receives inserts that have an axial threaded bore. The base is open at its lower end and can receive a threaded rod by virtue of ratcheting inserts received within the base. The inserts and base are particularly shaped to prevent jam and ease of insertion of the rod in the anchor. The anchor also has a head flange that sits above a plurality of fasteners secured to the anchor which is used to simultaneously drive the fasteners into a form for the concrete member. The fasteners are connected to the anchor extending in generally parallel and spaced relation to the anchor. The fasteners can be held by a support or sleeve-like holder which surrounds at least a portion of the base of the anchor or they can be attached to the base of the anchor. The fasteners project downwardly through the bottom of the anchor for driving into the form board.

19 Claims, 19 Drawing Sheets

(51) Int. Cl.
  *E04B 9/18* (2006.01)
  *E04G 21/18* (2006.01)

(56) References Cited

U.S. PATENT DOCUMENTS

| | | |
|---|---|---|
| 518,165 A | 4/1894 | Thalaker |
| 560,554 A | 12/1895 | Wiestner |
| 582,424 A | 12/1896 | Hunt |
| 581,551 A | 4/1897 | Green |
| 601,249 A | 3/1898 | Geise |
| 856,868 A | 6/1907 | Heffner |
| 901,681 A | 10/1908 | Collet |
| 991,517 A | 5/1911 | Kennedy |
| 1,005,227 A | 10/1911 | Jones |
| 1,018,490 A | 2/1912 | Hall |
| 1,045,562 A | 11/1912 | Kennedy |
| 1,072,361 A | 9/1913 | Rickman |
| 1,185,765 A | 6/1916 | Brooks |
| 1,264,189 A | 4/1918 | Keator |
| 1,347,687 A | 12/1919 | Ellis et al. |
| 1,344,417 A | 6/1920 | Lovekin |
| 1,374,713 A | 4/1921 | Bell |
| 1,447,515 A | 3/1923 | Miller |
| 1,539,348 A | 5/1925 | Botscheller |
| 1,589,307 A | 6/1926 | Svebili |
| 1,737,543 A | 11/1929 | Schaefer |
| 1,746,978 A | 2/1930 | Winkler |
| 1,837,930 A * | 12/1931 | Waite ............... 248/58 |
| 1,867,296 A | 7/1932 | Woodruff |
| 1,918,378 A | 7/1933 | Burnham |
| 1,940,545 A | 12/1933 | Holmes |
| 1,953,354 A | 4/1934 | Holland-Letz |
| 1,966,780 A | 7/1934 | Wyrick |
| 2,021,051 A | 11/1935 | Desbrueres |
| 2,066,541 A | 1/1937 | Schenk |
| 2,214,756 A | 9/1940 | Walsh |
| 2,261,537 A | 11/1941 | Zamarra |
| 2,294,745 A | 9/1942 | Goetz |
| 2,405,889 A | 8/1946 | Kennedy |
| 2,449,846 A | 9/1948 | Gilman |
| 2,576,579 A | 11/1951 | Donovan |
| 2,587,560 A | 2/1952 | Widmer |
| 2,625,815 A | 1/1953 | Black |
| 2,685,812 A | 8/1954 | Dmitroff |
| 2,687,788 A | 8/1954 | Rapp |
| 2,689,987 A | 9/1954 | Berger |
| 2,690,682 A | 10/1954 | Passman |
| 2,896,496 A | 7/1959 | Jansen |
| 3,042,161 A | 7/1962 | Meyer |
| 3,088,784 A | 5/1963 | Melton et al. |
| 3,104,645 A | 9/1963 | Harrison |
| 3,115,804 A | 12/1963 | Johnson |
| 3,118,681 A | 1/1964 | Fuehrer |
| 3,151,652 A | 10/1964 | Zahodiakin |
| 3,157,215 A | 11/1964 | Zahodiakin |
| 3,157,966 A | 11/1964 | Shelburne |
| 3,161,174 A | 12/1964 | Harrison |
| 3,174,386 A | 3/1965 | Lewis |
| 3,187,621 A | 6/1965 | Turner |
| 3,224,591 A | 12/1965 | Sawyer |
| 3,285,120 A | 11/1966 | Kartiala |
| 3,306,154 A | 2/1967 | Bailey |
| 3,325,175 A | 6/1967 | Lower |
| 3,372,523 A | 3/1968 | Hall |
| 3,391,514 A | 7/1968 | Hall |
| 3,405,497 A * | 10/1968 | McNair ............... 52/699 |
| 3,429,092 A | 2/1969 | Perry et al. |
| 3,440,334 A | 4/1969 | Blomstrand |
| 3,443,351 A | 5/1969 | Kumazawa |
| 3,469,492 A | 9/1969 | Dahl |
| 3,476,010 A | 11/1969 | Markey et al. |
| 3,479,897 A | 11/1969 | Holthofer |
| 3,509,670 A | 5/1970 | Boll et al. |
| 3,514,917 A | 6/1970 | Merrill, Sr. |
| 3,517,470 A | 6/1970 | Luebkeman |
| 3,540,762 A | 11/1970 | Dunlap |
| 3,579,938 A | 5/1971 | Hanson |
| 3,613,201 A | 10/1971 | Herbenar |
| 3,693,312 A | 9/1972 | Miller |
| 3,722,165 A | 3/1973 | Forsberg et al. |
| 3,728,933 A | 4/1973 | Grube |
| 3,742,809 A | 7/1973 | Zifferer |
| 3,769,774 A | 11/1973 | Barnes |
| 3,782,061 A | 1/1974 | Minutoli et al. |
| 3,798,866 A | 3/1974 | Werstein |
| 3,842,709 A | 10/1974 | Fuqua |
| 3,843,080 A | 10/1974 | Imai et al. |
| 3,850,535 A | 11/1974 | Howlett et al. |
| 3,867,804 A | 2/1975 | Wilson |
| 3,878,757 A | 4/1975 | Puklus, Jr. |
| 3,884,004 A | 5/1975 | Douma et al. |
| 3,889,916 A | 6/1975 | Ilukowicz |
| 3,896,599 A | 7/1975 | Werstein et al. |
| 3,927,497 A | 12/1975 | Yoshinaga et al. |
| 3,935,685 A | 2/1976 | Howlett |
| 3,948,141 A | 4/1976 | Shinjo |
| 3,960,047 A | 6/1976 | Liffick |
| 4,000,591 A | 1/1977 | Courtois |
| 4,000,681 A | 1/1977 | Coldren |
| 4,007,563 A | 2/1977 | Nakagawa |
| 4,007,564 A | 2/1977 | Chisholm |
| 4,020,734 A | 5/1977 | Bell |
| 4,037,516 A | 7/1977 | Hart |
| 4,047,463 A | 9/1977 | Coldren |
| 4,055,875 A | 11/1977 | Strickland |
| 4,083,162 A | 4/1978 | Regan |
| 4,117,643 A | 10/1978 | Lamothe |
| 4,118,910 A | 10/1978 | McSherry et al. |
| 4,149,446 A | 4/1979 | Spengler et al. |
| 4,157,876 A | 6/1979 | Digiulio |
| 4,169,569 A | 10/1979 | Riegler et al. |
| 4,195,709 A | 4/1980 | Gianotti et al. |
| 4,211,048 A * | 7/1980 | Naka ............... 52/700 |
| 4,239,489 A | 12/1980 | Ellman et al. |
| 4,250,681 A | 2/1981 | Helderman |
| 4,261,598 A | 4/1981 | Cornwall |
| 4,286,482 A | 9/1981 | Marsch |
| 4,287,807 A | 9/1981 | Pacharis et al. |
| 4,325,575 A | 4/1982 | Holt et al. |
| 4,363,164 A | 12/1982 | Okada |
| 4,370,018 A | 1/1983 | Lane |
| 4,408,940 A | 10/1983 | Fischer |
| 4,433,879 A | 2/1984 | Morris |
| 4,445,303 A | 5/1984 | Judkins |
| 4,479,747 A | 10/1984 | Pagel |
| 4,604,014 A | 8/1986 | Frano |
| 4,650,276 A | 3/1987 | Lanzisera et al. |
| 4,665,672 A | 5/1987 | Commins |
| 4,684,284 A | 8/1987 | Bradley, Jr. |
| 4,703,711 A | 11/1987 | Haynes |
| 4,708,555 A | 11/1987 | Terry |
| 4,720,223 A | 1/1988 | Neights |
| 4,726,561 A | 2/1988 | Worzala, Jr. |
| 4,729,703 A | 3/1988 | Sato |
| 4,761,860 A | 8/1988 | Krauss |
| 4,801,231 A | 1/1989 | Everman |
| 4,812,096 A | 3/1989 | Peterson |
| 4,823,528 A | 4/1989 | Faw |
| 4,875,314 A | 10/1989 | Boilen |
| 4,887,948 A | 12/1989 | Calmettes |
| 4,896,985 A | 1/1990 | Commins |
| 4,909,012 A | 3/1990 | Thompson et al. |
| 4,911,726 A | 3/1990 | Warkentin |
| 4,919,122 A | 4/1990 | Kohlenbrenner |
| 4,922,771 A | 5/1990 | Campbell |
| 4,936,843 A | 6/1990 | Sohngen |
| 4,945,704 A | 8/1990 | Brown, Jr. |
| 4,954,032 A | 9/1990 | Morales |
| 4,974,888 A | 12/1990 | Childers |
| 4,979,857 A | 12/1990 | Wing |
| 5,015,132 A | 5/1991 | Turner |
| 5,015,133 A | 5/1991 | Arena |
| 5,081,811 A | 1/1992 | Sasaki |
| 5,085,547 A | 2/1992 | Vanotti |

(56) References Cited

U.S. PATENT DOCUMENTS

| | | | |
|---|---|---|---|
| 5,090,855 A | 2/1992 | Terry | |
| 5,118,237 A | 6/1992 | Wright | |
| 5,168,681 A | 12/1992 | Ayrapetyan | |
| 5,180,268 A | 1/1993 | Richardson | |
| 5,197,176 A | 3/1993 | Reese | |
| 5,199,835 A | 4/1993 | Turner | |
| 5,205,690 A | 4/1993 | Roth | |
| 5,207,543 A | 5/1993 | Kirma | |
| 5,226,770 A * | 7/1993 | Watson | 411/397 |
| 5,228,250 A | 7/1993 | Kesselman | |
| 5,249,404 A | 10/1993 | Leek | |
| 5,254,016 A | 10/1993 | Ganthier | |
| 5,265,326 A | 11/1993 | Scribner | |
| 5,308,184 A | 5/1994 | Bernard | |
| 5,316,319 A | 5/1994 | Suggs | |
| 5,340,252 A | 8/1994 | Weddendorf | |
| 5,340,258 A | 8/1994 | Simon | |
| 5,347,777 A | 9/1994 | Sudduth | |
| 5,364,214 A | 11/1994 | Fazekas | |
| 5,365,715 A | 11/1994 | Steinmetz et al. | |
| 5,370,483 A | 12/1994 | Hood | |
| 5,375,384 A | 12/1994 | Wolfson | |
| 5,379,563 A | 1/1995 | Tinsley | |
| 5,386,748 A | 2/1995 | Kilgore | |
| 5,428,936 A * | 7/1995 | Roth | 52/704 |
| 5,466,015 A | 11/1995 | Berenter | |
| 5,468,105 A | 11/1995 | Iwamoto | |
| 5,487,632 A | 1/1996 | Hood | |
| 5,505,026 A | 4/1996 | Intilla | |
| 5,522,688 A | 6/1996 | Reh | |
| 5,535,561 A | 7/1996 | Schuyler | |
| 5,540,530 A | 7/1996 | Fazekas | |
| 5,568,711 A | 10/1996 | Popp et al. | |
| 5,570,549 A | 11/1996 | Lung et al. | |
| 5,582,496 A | 12/1996 | Ambrico | |
| 5,605,423 A | 2/1997 | Janusz | |
| 5,606,839 A | 3/1997 | Baumann | |
| 5,628,161 A | 5/1997 | Giannuzi et al. | |
| 5,641,256 A | 6/1997 | Gundy | |
| 5,649,798 A | 7/1997 | Ito | |
| 5,653,078 A | 8/1997 | Kies et al. | |
| 5,653,563 A | 8/1997 | Ernst et al. | |
| 5,704,572 A | 1/1998 | Vogel | |
| 5,740,651 A | 4/1998 | Vanotti | |
| 5,769,581 A | 6/1998 | Wallace | |
| 5,772,372 A | 6/1998 | Lins et al. | |
| 5,815,999 A | 10/1998 | Williams | |
| 5,829,531 A | 11/1998 | Hebert | |
| 5,839,321 A | 11/1998 | Siemons | |
| 5,885,034 A | 3/1999 | Fergusson | |
| 5,931,618 A | 8/1999 | Wallace | |
| 5,937,609 A | 8/1999 | Roth | |
| 5,957,644 A | 9/1999 | Vaughan | |
| 5,979,130 A | 11/1999 | Gregg et al. | |
| 5,987,828 A | 11/1999 | Hardy | |
| 6,007,284 A | 12/1999 | Taneichi | |
| 6,019,556 A | 2/2000 | Hess | |
| 6,026,618 A | 2/2000 | Loke et al. | |
| 6,068,250 A | 5/2000 | Hawkins et al. | |
| 6,079,179 A | 6/2000 | Shoemaker, Jr. | |
| 6,120,723 A | 9/2000 | Butler | |
| 6,135,687 A | 10/2000 | Leek et al. | |
| 6,139,113 A | 10/2000 | Seliga | |
| 6,158,188 A | 12/2000 | Shahnazariah | |
| 6,161,339 A | 12/2000 | Cornett et al. | |
| 6,161,350 A | 12/2000 | Espinosa | |
| 6,167,785 B1 | 1/2001 | Penner | |
| 6,195,949 B1 | 3/2001 | Schuyler | |
| 6,240,697 B1 * | 6/2001 | Thompson et al. | 52/698 |
| 6,250,041 B1 | 6/2001 | Seccombe | |
| 6,256,960 B1 | 7/2001 | Babcock et al. | |
| 6,282,994 B1 | 9/2001 | Wei | |
| 6,309,158 B1 | 10/2001 | Bellinghausen et al. | |
| 6,327,831 B1 | 12/2001 | Leek | |
| 6,341,452 B1 | 1/2002 | Bollinghaus | |
| 6,350,093 B1 | 2/2002 | Petersen et al. | |
| 6,367,205 B2 | 4/2002 | Cornett, Sr. | |
| 6,390,747 B1 | 5/2002 | Commins | |
| 6,494,654 B2 | 12/2002 | Espinosa | |
| 6,513,290 B2 | 2/2003 | Leek | |
| 6,513,300 B1 | 2/2003 | James | |
| 6,585,469 B2 | 7/2003 | Commins | |
| 6,688,058 B2 | 2/2004 | Espinosa | |
| 6,745,649 B1 | 6/2004 | Liao | |
| 6,904,728 B2 | 6/2005 | Stutts | |
| 6,959,902 B2 | 11/2005 | Leahy | |
| 6,964,115 B2 | 11/2005 | Kim | |
| 7,093,400 B1 * | 8/2006 | Thompson et al. | 52/698 |
| 7,144,530 B2 | 12/2006 | Ward et al. | |
| 7,150,132 B2 | 12/2006 | Commins | |
| 7,174,679 B1 | 2/2007 | Mueller | |
| 7,296,382 B2 | 11/2007 | Sack | |
| 7,422,404 B2 | 9/2008 | Kitamura et al. | |
| 7,445,192 B2 | 11/2008 | Gridley et al. | |
| 7,516,582 B2 | 4/2009 | Leek | |
| 7,744,322 B2 | 6/2010 | Taneichi | |
| 7,752,824 B2 | 7/2010 | Brown et al. | |
| 7,766,299 B2 | 8/2010 | Titus et al. | |
| 7,802,940 B2 | 9/2010 | Parker | |
| 7,905,066 B2 | 3/2011 | Pryor et al. | |
| 7,946,086 B2 | 5/2011 | Hammer et al. | |
| 7,971,411 B2 | 7/2011 | Commins | |
| 8,051,615 B2 | 11/2011 | Matthews et al. | |
| 8,136,318 B2 | 3/2012 | Espinosa | |
| 8,201,381 B2 | 6/2012 | Heath | |
| 8,257,004 B2 | 9/2012 | Smith | |
| 8,267,628 B2 | 9/2012 | Noce et al. | |
| 8,276,334 B2 | 10/2012 | Matthews et al. | |
| 8,281,528 B2 | 10/2012 | Clarke | |
| 8,590,247 B2 | 11/2013 | Cooke | |
| 8,621,816 B1 | 1/2014 | Lin et al. | |
| 8,708,629 B2 | 4/2014 | Smith | |
| 2001/0002529 A1 | 6/2001 | Commins et al. | |
| 2001/0037611 A1 | 11/2001 | Cornett, Sr. | |
| 2002/0020137 A1 | 2/2002 | Commins | |
| 2002/0037205 A1 | 3/2002 | Taneichi | |
| 2002/0092383 A1 | 7/2002 | Nezigane | |
| 2002/0131845 A1 | 9/2002 | Commins | |
| 2002/0189175 A1 | 12/2002 | Lancelot et al. | |
| 2003/0230032 A1 | 12/2003 | Shahnazarian et al. | |
| 2004/0096292 A1 | 5/2004 | Duran et al. | |
| 2005/0055897 A1 | 3/2005 | Commins | |
| 2006/0000318 A1 | 1/2006 | Hsieh | |
| 2006/0137285 A1 | 6/2006 | Brown | |
| 2006/0222454 A1 | 10/2006 | Parker | |
| 2007/0095004 A1 | 5/2007 | Heath | |
| 2007/0286702 A1 | 12/2007 | Smith | |
| 2008/0292391 A1 | 11/2008 | Spence et al. | |
| 2009/0272067 A1 | 11/2009 | Gilham | |
| 2010/0290859 A1 | 11/2010 | Noce et al. | |
| 2011/0041449 A1 | 2/2011 | Espinosa | |
| 2011/0041450 A1 | 2/2011 | Espinosa | |
| 2011/0107715 A1 | 5/2011 | Cooke | |
| 2011/0192111 A1 | 8/2011 | White et al. | |
| 2013/0067849 A1 | 3/2013 | Espinosa | |
| 2013/0340366 A1 * | 12/2013 | Gray et al. | 52/223.14 |
| 2014/0157717 A1 | 6/2014 | Espinosa | |

FOREIGN PATENT DOCUMENTS

| | | |
|---|---|---|
| CH | 684648 A5 | 11/1994 |
| EP | 0352542 A2 | 1/1990 |
| EP | 1103734 A | 3/2004 |
| EP | 1536149 | 1/2008 |
| FR | 1332745 | 6/1963 |
| GB | 383460 A | 11/1932 |
| GB | 558302 | 12/1943 |
| GB | 590430 | 7/1947 |
| GB | 752272 A | 7/1956 |
| GB | 901681 | 7/1962 |
| GB | 1099472 A | 1/1968 |
| GB | 1384511 A | 2/1975 |
| GB | 2201216 A | 8/1988 |
| GB | 2262583 A | 6/1993 |

(56) References Cited

FOREIGN PATENT DOCUMENTS

| | | |
|---|---|---|
| GB | 2404708 A | 9/2005 |
| JP | 46001521 A | 1/1971 |
| JP | 59140604 | 9/1984 |
| JP | 2200936 | 8/1990 |
| JP | 476136 | 3/1992 |
| JP | 5230893 | 9/1993 |
| JP | 2001214534 | 8/2001 |
| JP | 2010196355 | 9/2010 |
| JP | 201247244 A | 3/2012 |
| JP | 201364415 A | 4/2013 |
| SU | 706586 A1 | 12/1979 |
| SU | 796498 A1 | 1/1981 |
| WO | WO99/24724 | 5/1999 |
| WO | WO2006055905 A1 | 5/2006 |
| WO | WO2008016543 A2 | 2/2008 |
| WO | WO2008105045 A1 | 9/2008 |
| WO | WO2008124578 A2 | 10/2008 |
| WO | WO 2010/090736 | 8/2011 |
| WO | WO 2010/090748 | 8/2011 |
| WO | WO2011110878 A1 | 9/2011 |
| WO | WO2011/150537 A1 | 12/2011 |
| WO | WO2013/020027 A1 | 2/2013 |

OTHER PUBLICATIONS

Arthur B. Richardson, Declaration of Arthur B. Richardson, executed Dec. 21, 2002, p. 106.
Anchor Tiedown Systems, Inc., "Expansion Jack Washer," Anchor Tiedown System, Inc. Brochure, 1999, 1 page, Mill Valley, CA and Burien, WA.
"Expansion Jack Washer," A, 1999, 1 page.
"Thru-Bolt Log Fastening System," Heritage Log Homes, 1999, 1 page.
"Earthbound Seismic Holdown System ing The "Impasse Device"," Evaluation Report, ICBO Evaluation Service, Inc. (A), p. 1-6, Nov. 1, 1997, 6 pages.
"The Impasse Devise," Inquest Engineering, 1997, 1 page.
"LocTite, Automatic Self-Locking Nuts," LocTite, A, Oct. 1992, 6 pages.
"Auto Take-Up," Zone Four Engineered Seismic Solutions, A, p. 1-4, 2000, 4 pages.
"AT Auto Take-Up," Zone Four Innovative Engineered Solutions, 2001, 2 pages, Friday Harbor, WA USA.
"ATS-Components," Simpson Strong-Tie Co., Inc. 2 pages, Submitted Jun. 28, 2010, 2 pages, Pleasanton, CA, USA.
Commins Design LLC, "Acceptance Criteria for Shrinkage Compensating Devices and Similar Devices," Proposed ICBO Take-UP, Devices Acceptance Criteria, Draft 1, Dec. 9, 1999, Commins Design LLC, Nov. 2, 1999 and Dec. 9, 1999, 3 pages, Friday Harbor, WA.
Commins Design LLC, "ICBO Evaluation Service Inc. Evaluation Report, ER-XXXX Dec. 10, 1999," Proposed, 1.0 Subject Commins Design AT Automatic Take-Up Shrinkage Compensating Devices, Commins Design LLC, 5 pages, Dec. 10, 1999, Friday Harbor, WA.
Commins Design LLC, "AT Auto Take-Up," Shearwall Shrinkage Compensator Solves the Loose Shearwall Problem, Commins Design LLC, 1 page, Jan. 3, 2000, Friday Harbor, WA.
Commins Design LLC, "Commins Design LLC," Our Solution to Wood Shrinkage Solves Shearwall Problems, Commins Design LLC, 2 pages, Jan. 2000, Friday Harbor, WA.
Commins, Alfred D., U.S. Appl. No. 60/156,042, titled "Shrinkage Compensator for Building Tiedowns," 31 pages, Sep. 24, 1999.
Alfred D. Commins, Automatic take Up Device, Feb. 10, 1997, 5 pages.
Alfred D. Commins, Automatic take Up Device, Aug. 15, 1996, 7 pages.
Alfred D. Commins, Automatic take Up Device, Mar. 6, 1996, 3 pages.
"Acceptance Criteria for Shrinkage Compensating Devices: AC316," Evaluation Report p. 1-5, Nov. 2005, 5 pages, ICC Evaluation Service, Inc., USA.
Alfred D. Commins, Automatic take Up Device, Mar. 6, 1996 and Jan. 25, 1996, 5 pages.
Alfred D. Comins, Automatic take Up Device, Dec. 20, 1995, 3 pages.
"Holdowns", Simpson Strong-Tie Catalog: Connectors For Wood Construction, Catalog C87H-1, cover page and p. 8, Simpson Strong-Tie Company, Inc., 1987, 2 pages, USA.
"Strong-Tie Rod System", Simpson Strong-Tie Catalog C-HW02, back page and p. 21, Simpson Strong-Tie Company, Inc., Nov. 2002, USA.
ESR-2190—Cinch Nut Shrinkage Compensation Device: Models CN6, CN7, and CN8 and CN10, ICC Evaluation Service, Inc., Oct. 1, 2006, 4 pages, USA.
Probolt, "Structural Tie Down System," Product data sheet, installation instructions, and SBCCI Report No. 9916., 1999, 18 pages, Probolt, Orlando, Florida.
"Seismic Solutions Structural Tie Downs", Quake-Tie: The Superior Hold-Down Solution Brochure, Seismic Solutions, Inc., Glen Ellen, CA, 9 pages, Jan. 1998, USA.
"Blue Banger Hanger: Pre-Poured Concrete Steel Deck Inserts." Construction Engineered Attachment Solutions (CEAS); Products; Roof Deck Insert RDI143812; www.cceasattachments.com. Jan. 26, 2012.
Chainring Construction Products LLC, www.ptanchor.com, copyright 2009, home page, PT Anchor, Concept and Cut sheet, 2 pages.
"Device Keeps Shear Walls Tight," Rural Builder, p. 49-50, published at least as early as May 2000.
Inquest Engineering, Manufacturers of the Earthbound System, Redefining the State of the Art in Seismic Holdown Technology, 4 pages, USA, published at least as early as Jan. 21, 1998.
US 5,961,265, 10/1999, Kato (withdrawn)

* cited by examiner

CONCRETE ANCHOR

BACKGROUND OF THE INVENTION

This invention relates to an anchoring device, and more particularly, to a concrete anchor which is embedded in a concrete ceiling for suspension of a ceiling panel, electrical wiring pipe, air conditioning device, or the like.

Concrete anchors are well known in the prior art. They provide a means to hang building systems from concrete ceilings. The anchors are installed prior to pouring the concrete into a form that creates the level of a building. The concrete anchors are located in the ceiling at the proper locations by attaching them to the form that supports the concrete as it is hardening. The best concrete anchors are inexpensive to make and assemble, are quickly placed in the proper position on the form, are resistant to cement entering into the working mechanisms of the anchor, and can accept a variety of sizes of threaded rods for supporting the building elements. U.S. Pat. No. 1,940,545, issued in 1933 to Holmes, teaches an early concrete anchor made from cast iron and is hereby incorporated by reference. U.S. Pat. No. 3,405,497, issued in 1968 to McNair, teaches a modern concrete anchor made from both metal and plastic components to reduce the cost of manufacture and is hereby incorporated by reference. The use of plastic components also facilitates identification of the anchors by using differing colors of plastic which can be used to instruct users about the size of rod that can be used with the anchor. U.S. Pat. No. 4,211,048, issued in 1980 to Naka, also teaches a concrete anchor made from both metal and plastic components and is hereby incorporated by reference. The Naka patent focused on improving the manner in which the anchor is connected to the form. Naka shaped the parts, particularly the top of the anchor, so that the nails that attach the anchor to the form can be driven simultaneously. Published Japanese Patent Application 5-230893, filed in 1982, teaches a concrete anchor where the anchor receiving portion is made with a plurality of internal diameters so that one anchor can receive different sized threaded rods. U.S. Pat. No. 6,240,697, issued in 2001 to Thompson et al, also teaches a concrete anchor made from both metal and plastic components that can receive threaded rods of multiple diameters, the contents of which are hereby incorporated by reference.

A problem with all of the concrete anchors taught by the prior art is that the rod needs to be threaded into the anchor. This slows down installation of the suspended system and can be difficult as the user is generally working from below. There are a number of systems in the prior art where a threaded member is received by a slip nut or other device to hold the threaded member in place without having to thread the rod into the slip nut. U.S. patent application Ser. No. 13/531,159, filed Jun. 22, 2012, teaches an automatic take-up device that has threaded inserts that can receive a threaded rod without having to rotate the threaded rod into the device, the contents of which are hereby incorporated by reference.

The present invention provides a concrete anchor with inserts that can receive a threaded rod without having to thread the rod into the device that can be used with confidence in a concrete anchor where the anchor will be encapsulated by concrete and otherwise inaccessible to the user except for inserting the rod into place.

SUMMARY OF THE INVENTION

The present invention provides an anchor device for connecting a rod to a first structural member, in particular for suspending rods from a concrete ceiling, where the anchor device is encapsulated in concrete except for its bottom which is exposed, and yet can reliably grasp and hold a threaded rod without having to thread the rod into the member. This object is achieved by using ratcheting inserts received within the anchor.

It is an object of the present invention to provide a concrete anchor which allows for the insertion of rods of different sizes without requiring the rods be threaded into the concrete anchor. This object is achieved by forming the inserts with a rod receiving bore having multiple internal diameters.

It is another object of the present invention to provide a concrete anchor which is simple in construction and easy to manufacture, and yet can receive a sufficient length of a threaded rod without jamming so as to reliably hold the threaded rod.

It is also an object of the present invention to provide a concrete anchor that is easily installed in the form for the concrete member. This object is achieved by forming the insert receiving bore of the anchor with a bottom ledge and lip. This object is also achieved by forming the insert receiving bore with a smaller diameter mid-section. This object is also achieved by forming the inserts with frusto-spherical surfaces that engate the lower portion of the insert receiving bore. The object is also achieved by forming the inserts with external tabs that interface with notches in the housing and forming the tabs partially with sloping surfaces where they interface with the notches.

In accordance with the present, there is provided an anchor adapted to be embedded into a concrete construction for suspension of a ceiling panel, duct or the like. The anchor includes a base which receives inserts that have an axial threaded bore. The base is open at its lower end. The anchor also preferably has a head flange that sits above a plurality of fasteners secured to the anchor which is used to simultaneously drive the fasteners into a form for the concrete member. The fasteners are connected to the anchor extending in generally parallel and spaced relation to the anchor. The fasteners can be held by a support or sleeve-like holder which surrounds at least a portion of the base of the anchor or they can be attached to the base of the anchor. The fasteners project downwardly through the bottom of the anchor for driving into the form board.

DETAILED DESCRIPTION OF THE PREFERRED EMBODIMENTS

Figure 1:
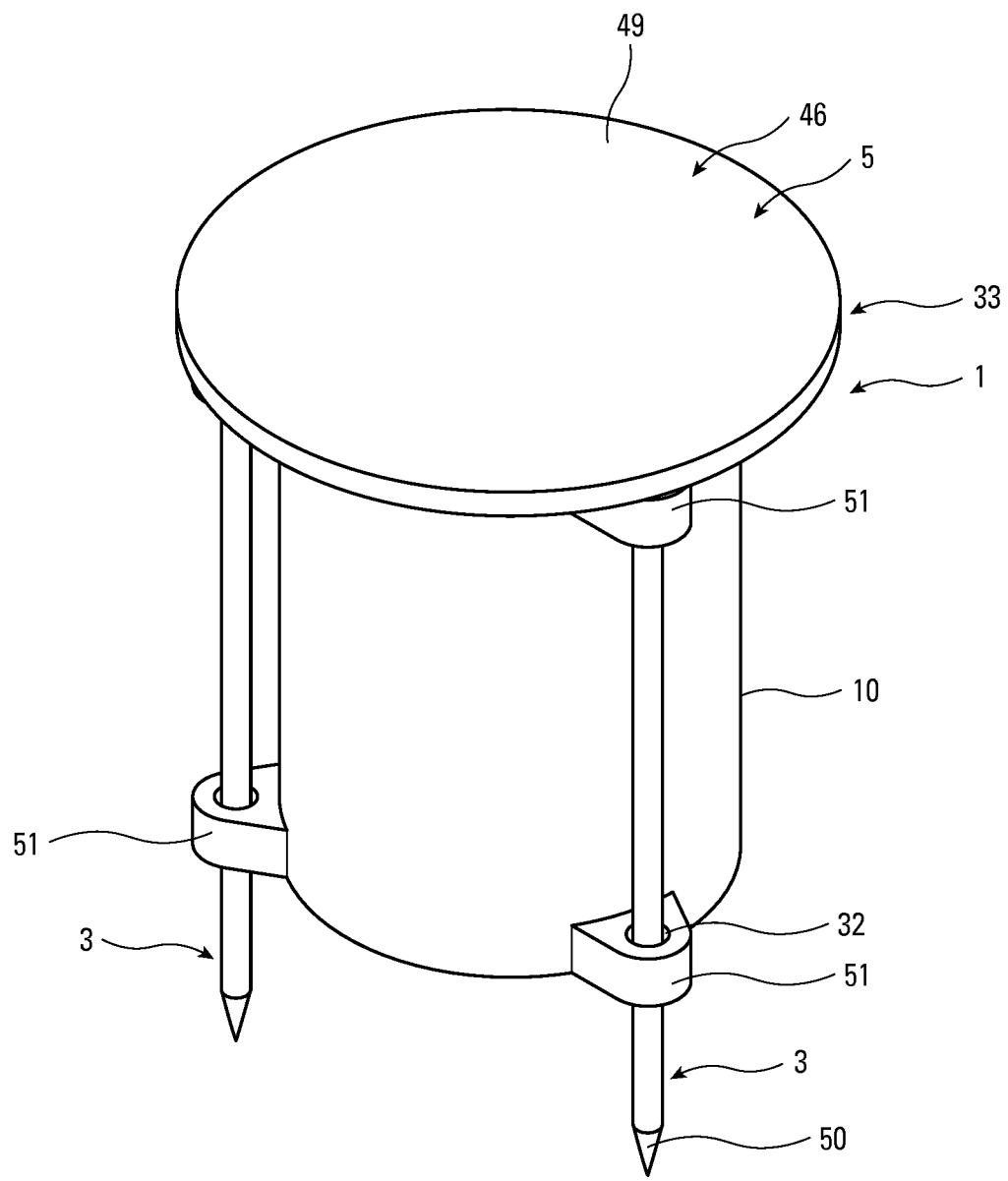
FIG. 1 is a perspective view of a first embodiment of the present invention.
Figure 13:
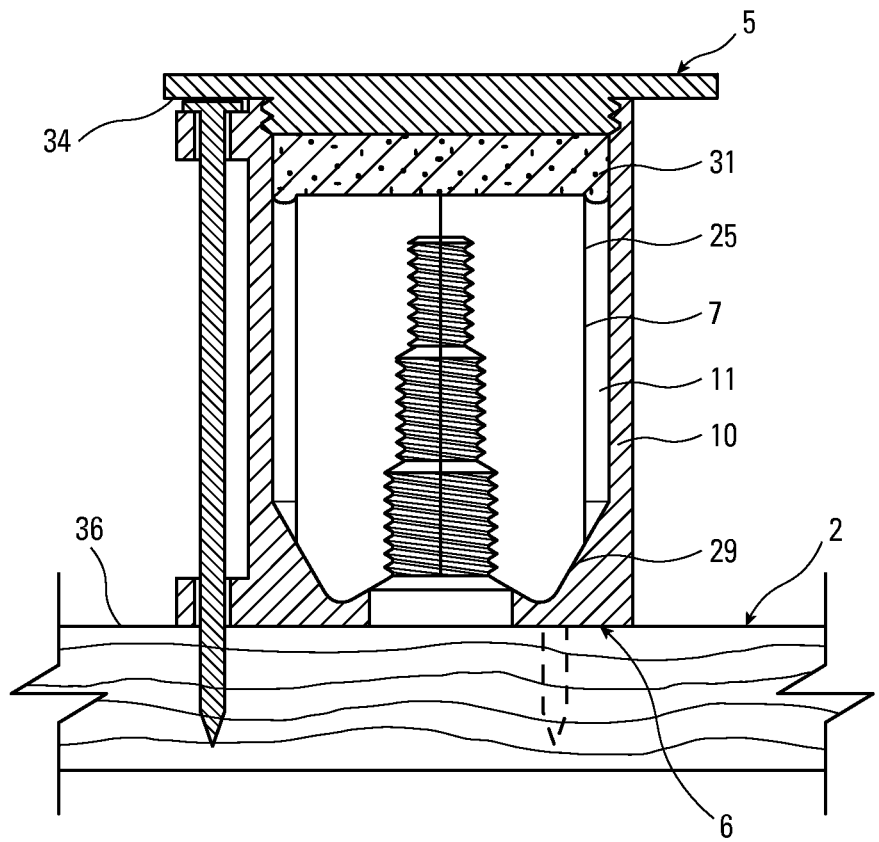
FIG. 13 is sectional, side view of the first, preferred embodiment of the present invention attached to a wood form.
Figure 14:
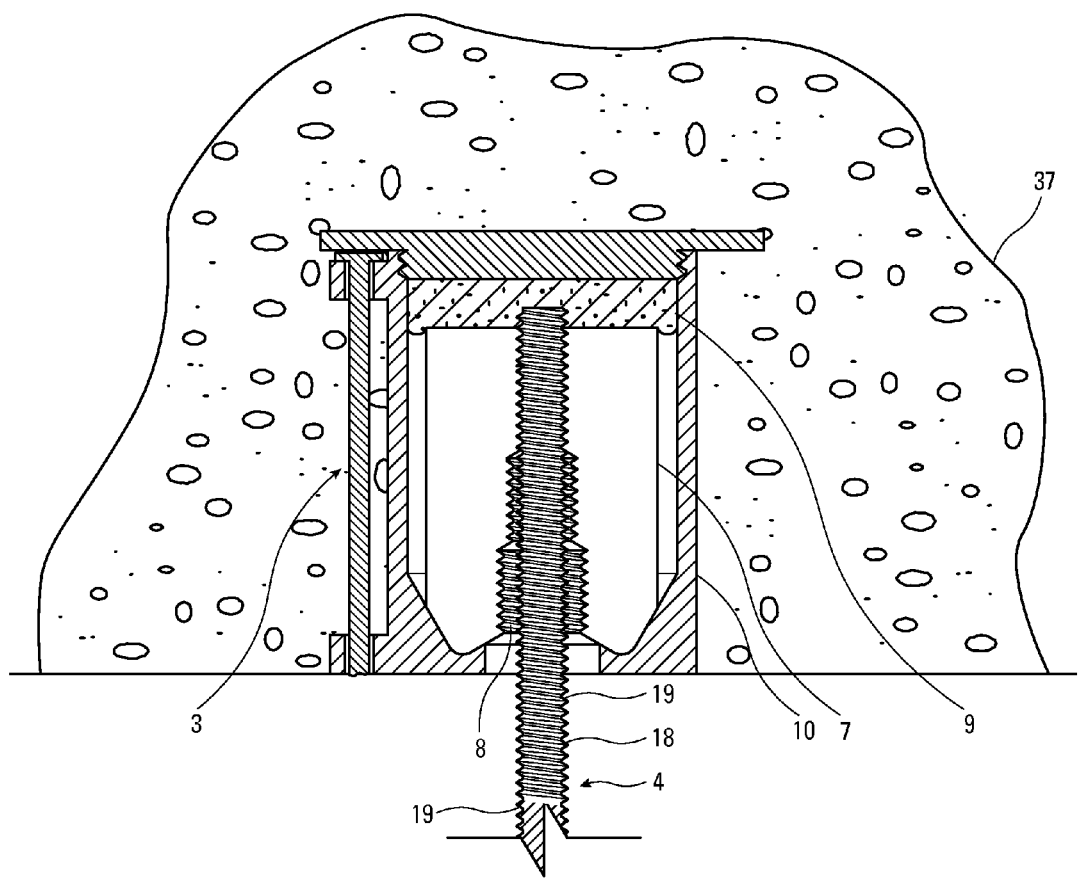
FIG. 14 is a sectional, side view of the first, preferred embodiment of the present invention installed in a concrete form with the form board removed and a threaded rod inserted into the concrete anchor.

The present invention teaches a concrete anchor or anchor 1 that is attached to a form 2 with nails 3 and can receive a threaded rod or tie rod or threaded bolt or vertical bolt 4. FIG. 1 shows a first, preferred embodiment of the concrete anchor 1 of the present invention. FIG. 13 shows the anchor 1 connected to form 2. FIG. 14 shows the anchor 1 embedded in a concrete member that can be considered a first structural member.

For clarity and convenience, the concrete anchor 1 of the present invention is described in a single, most common, orientation (except as noted otherwise) in which a top 5 faces up and a bottom 6 faces down. The concrete anchor 1 can, nevertheless, be installed in essentially any orientation, so that the top 5 can face down or to the side and the bottom 6 can face up or to the side so long as there is sufficient tension generated between the threaded rod 4 and the concrete anchor 1 for the anchor to grasp the threaded rod 4.

Figure 12:
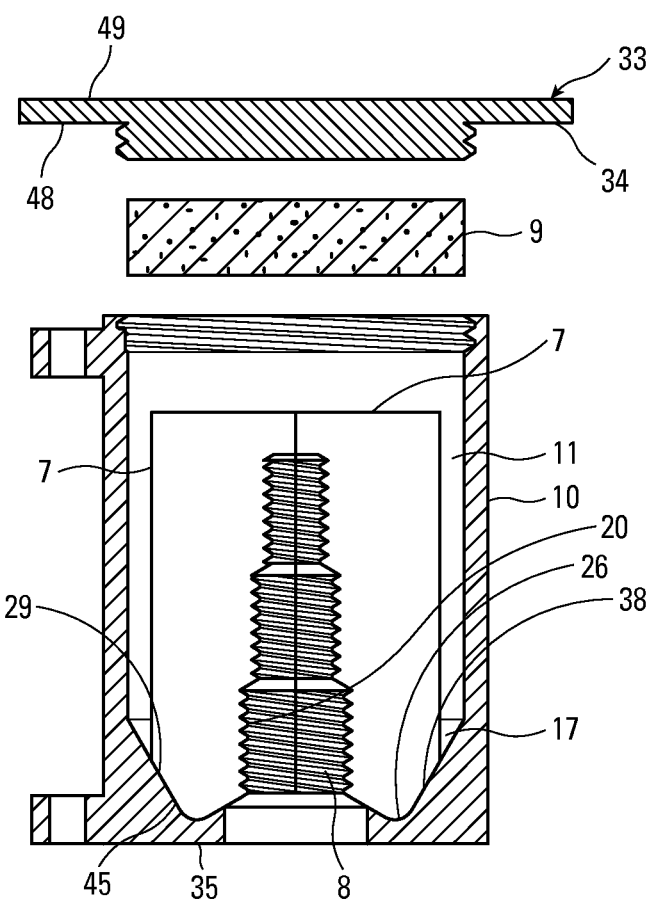
FIG. 12 is an exploded sectional, side view of the first, preferred embodiment of the present invention.
Figure 15:
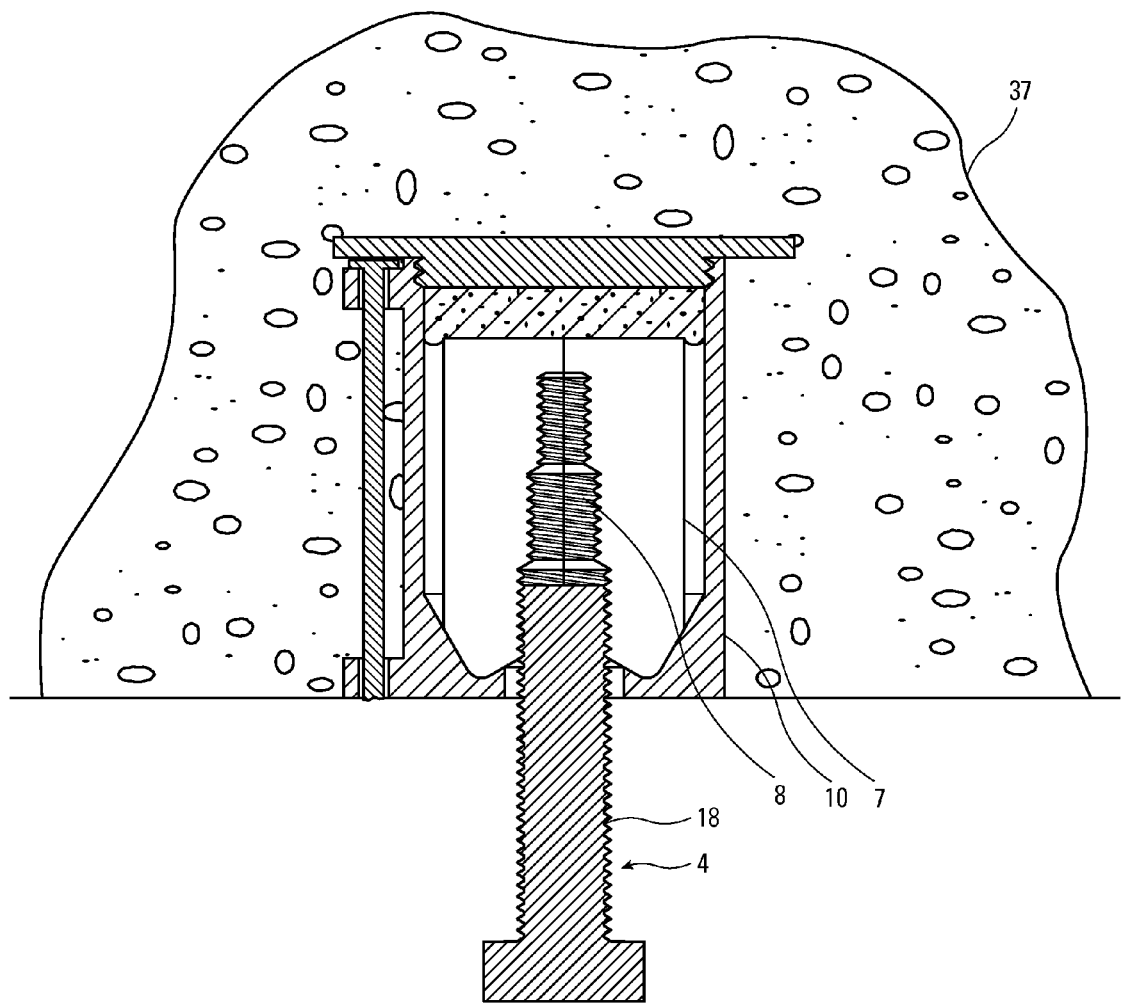
FIG. 15 is a sectional, side view of the first, preferred embodiment of the present invention installed in a concrete form with the form board removed and a threaded rod of differing diameter than the threaded rod shown in FIG. 14 inserted into the concrete anchor.
Figure 16:
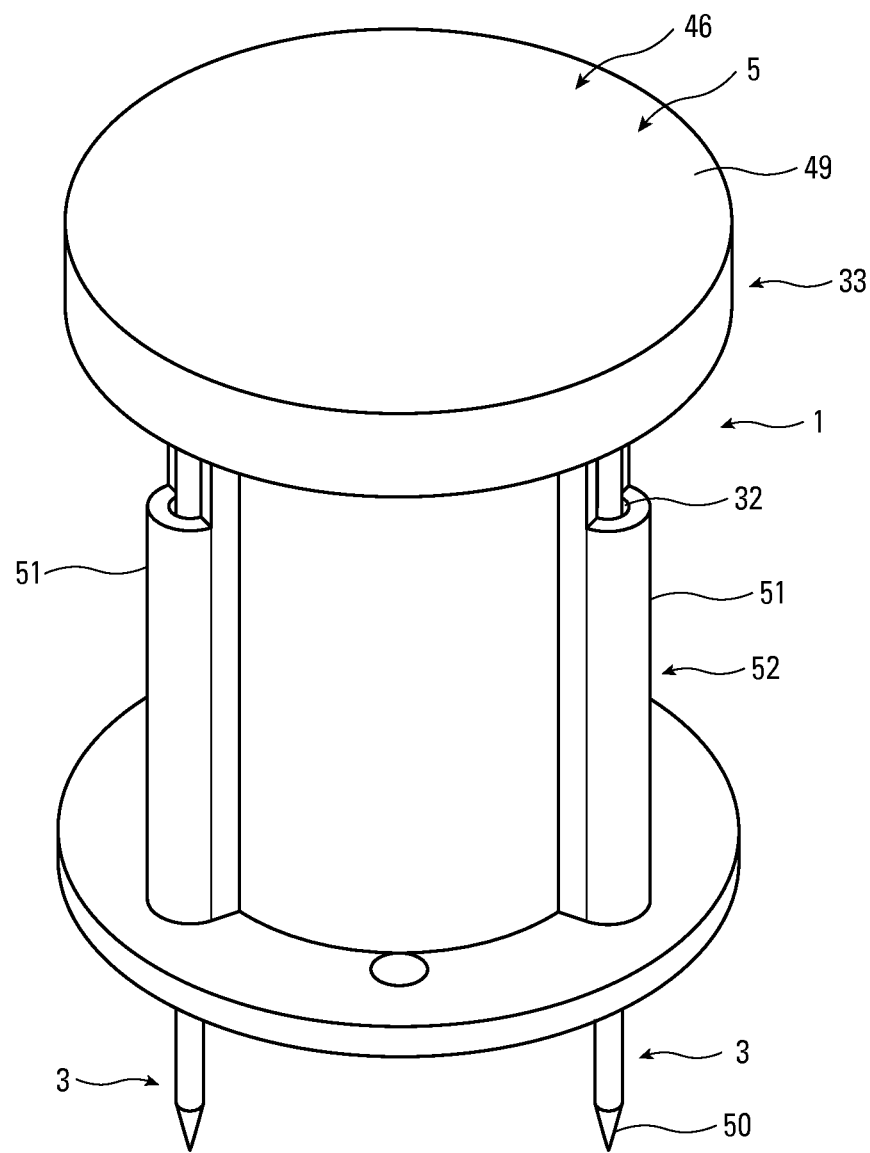
FIG. 16 is a perspective view of a second preferred embodiment of the present invention.
Figure 17:
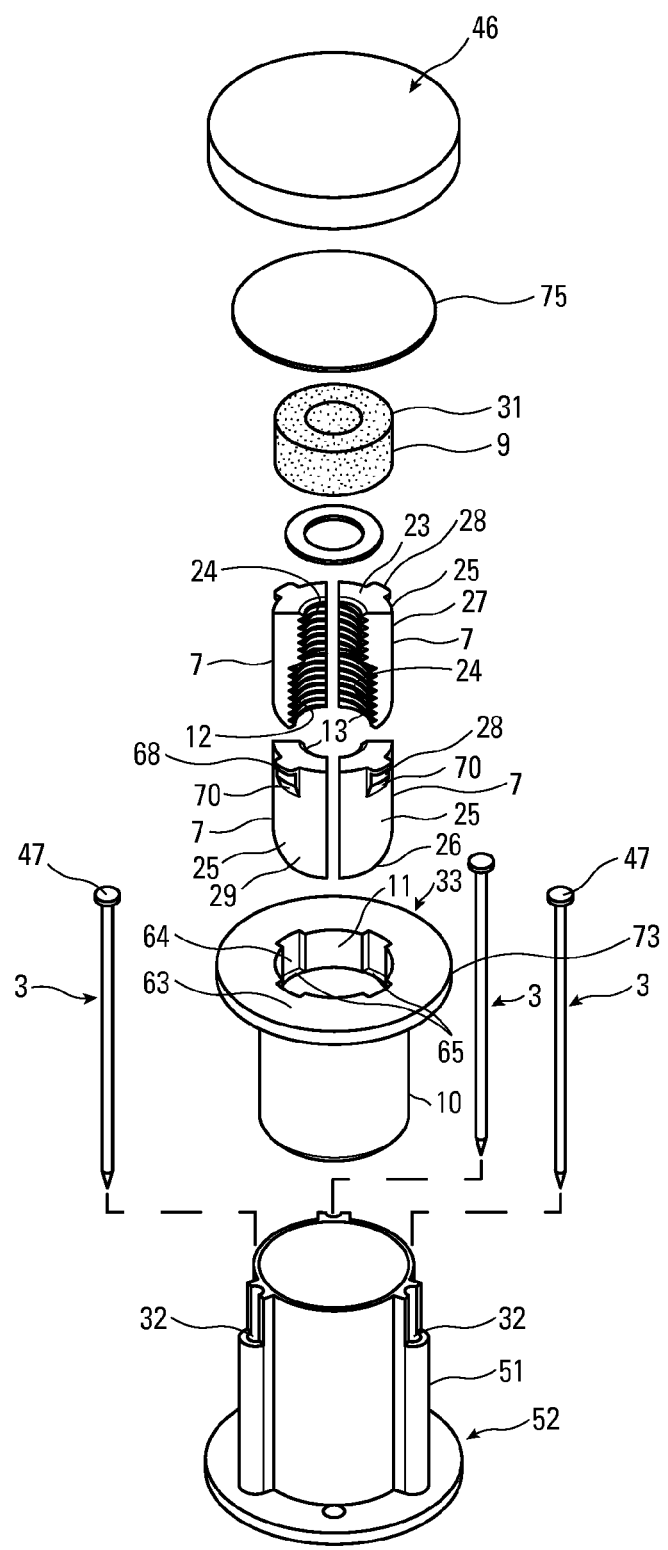
FIG. 17 is an exploded, perspective view of the second, preferred embodiment of the present invention.
Figure 18:
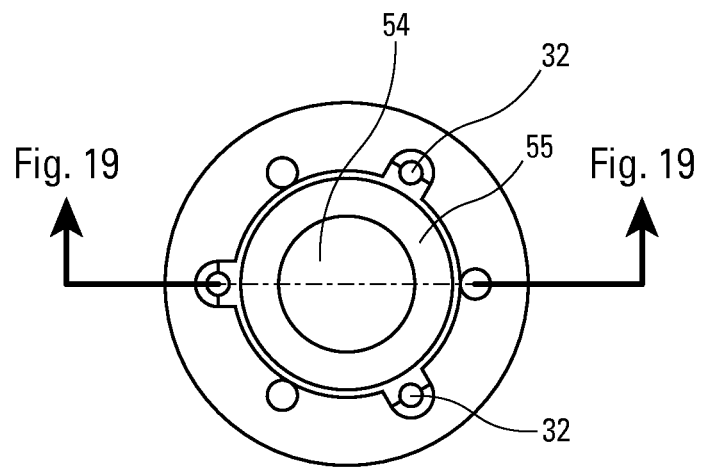
FIG. 18 is a top view of the holder of the second, preferred embodiment of the present invention.

As shown in FIGS. 12 and 15, the concrete anchor 1 of the present invention is provided with inserts 7 with concavities forming an interior rod receiving bore 8. The interior receiving bore 8 receives the threaded rod 4. The use of inserts 7 allows the threaded rod 4 to be inserted into the concrete anchor 1 without threading or rotating the threaded rod 4 into the anchor 1.

Figure 4:
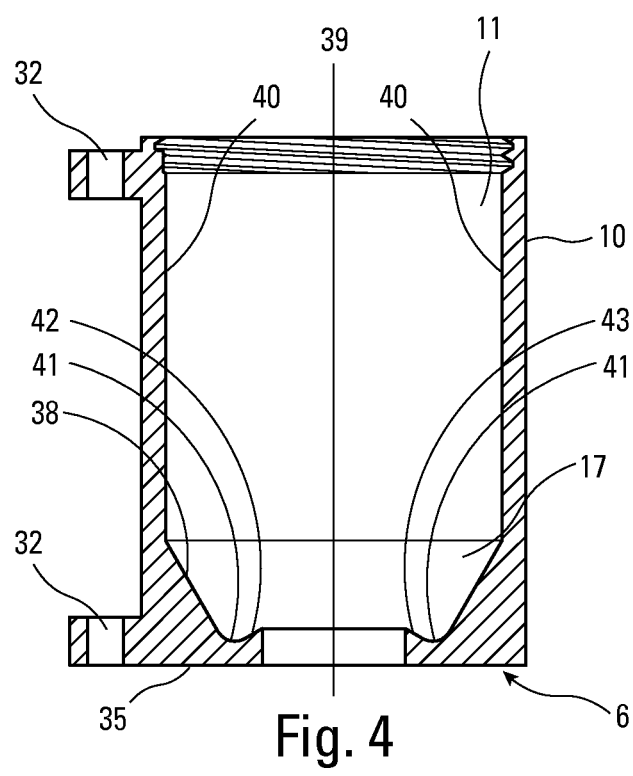
FIG. 4 is a sectional side view of the base of the first, preferred embodiment of the present invention.
Figure 5:
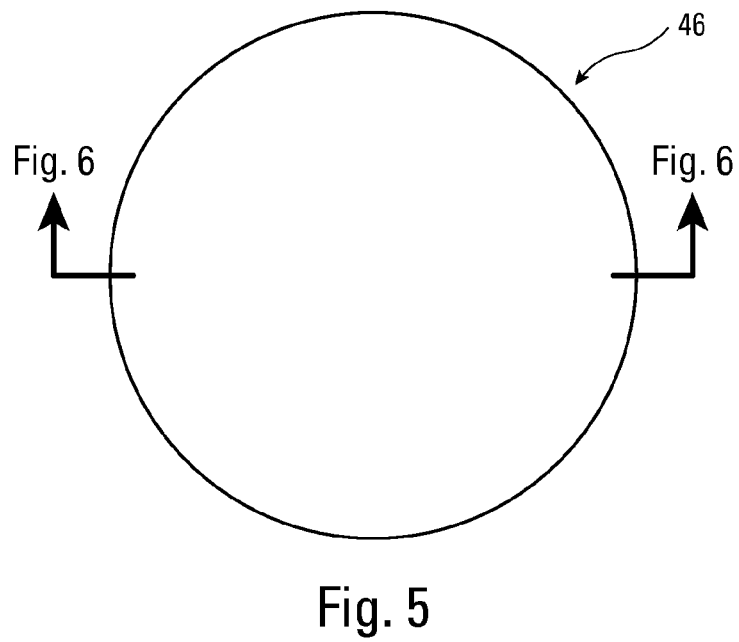
FIG. 5 is a top view of the cap of the first, preferred embodiment of the present invention.
Figure 6:
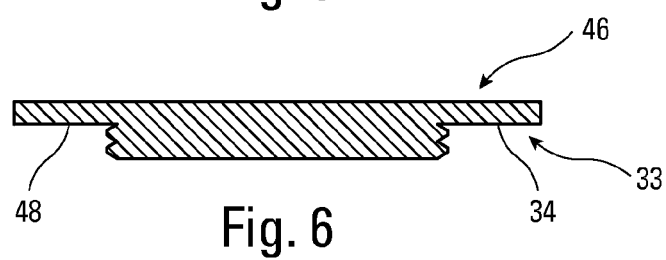
FIG. 6. is a sectional, side view of the cap of the first, preferred embodiment of the present invention.
Figure 7:
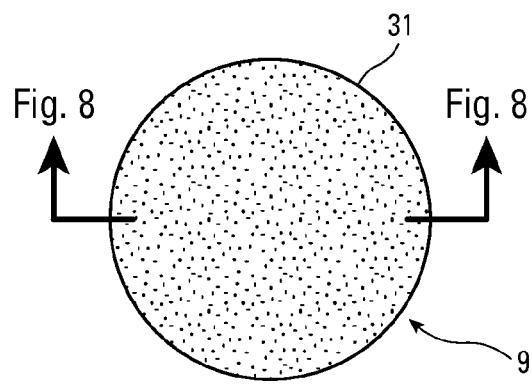
FIG. 7 is a top view of the compression spring of the first, preferred embodiment of the present invention.
Figure 8:
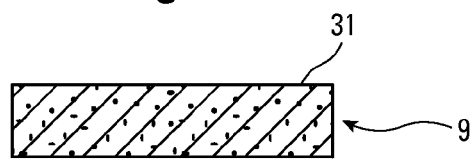
FIG. 8 is a sectional, side view of the compression spring of the first, preferred embodiment of the present invention.

The inserts 7 are formed and arranged so that they can grasp and hold a tie rod 4 received in the concrete anchor 1 that is typically subject to a tension load either from the weight of the tie rod 4 itself or from the weight of a member attached to the tie rod 4. The concrete anchor 1 is also preferably formed with a compression member 9 and narrowing base or housing 10 that pushes the inserts 7 downwardly and around the threaded rod 4 to grasp the threaded rod 4. The compression member 9 is shown by itself in FIGS. 7 and 8. The tie rod 4, inserts 7 and the base 10 are formed such that when the tie rod 4 moves downwardly with respect to the base 10, the inserts 7 will be pulled downwardly in the base or housing 10 as well. As shown in FIG. 4, the tension on the tie rod 4 combined with the narrowing in the lower portion 17 of the insert receiving bore or base bore 11 of the housing 10 causes a constriction of the insets 7 about the tie rod 4 forcing them to grasp and hold the tie rod 4.

When a tie rod 4 is first inserted up into the base 10, the upward movement of the tie rod 4 forces the inserts 7 apart from a constricted position. The constriction is preferably caused by the downward force of gravity, or tension on the rod 4, and also preferably by a compression member 9 placed above the inserts 7, combined with the narrowing in the lower portion 17 of the insert receiving bore 11 of the housing 10. The interface between the surface of the tie rod 4 and the inserts or insert segments 7 creates a ratcheting action as the tie rod 4 is pushed up and the insert segments 7 move up and out laterally, allowing the tie rod 4 to be inserted as far as needed into the housing 10 for installation.

Rather than being screwed into the inner bore or interior rod receiving bore 8, the threaded rod 4 is preferably pushed in without rotation and the inserts 7 react by moving apart and together, ratcheting when the threaded inner rod receiving bore 8 interfaces with a threaded bolt 4. The compression member 9 allows the inserts 7 to move up within the housing 10, and the upwardly-widening base bore 11 allows the insert segments 7 to move apart. This allows the threaded bolt 4 to be inserted into the inner bore 8, and as the threaded bolt 4 and the threaded portions 12 of the inner surface 13 of the inserts 7 slide against each other, the inserts 7 are moved up and outwardly and down and inwardly repeatedly, the inward motion urged by the compression member 9 and the narrowing base bore 11 in the housing 10. The threaded bolt 4 can only be inserted in one direction because when it is pulled down, the downwardly-narrowing outer base bore 11 forces the insert segments 7 against the threaded rod 4 so that the threaded bolt 4 and the threaded portion 12 of inner surface 13 of the inserts 7 interlock as if the threaded bolt 4 had been screwed into a conventional solid nut.

Figure 2:
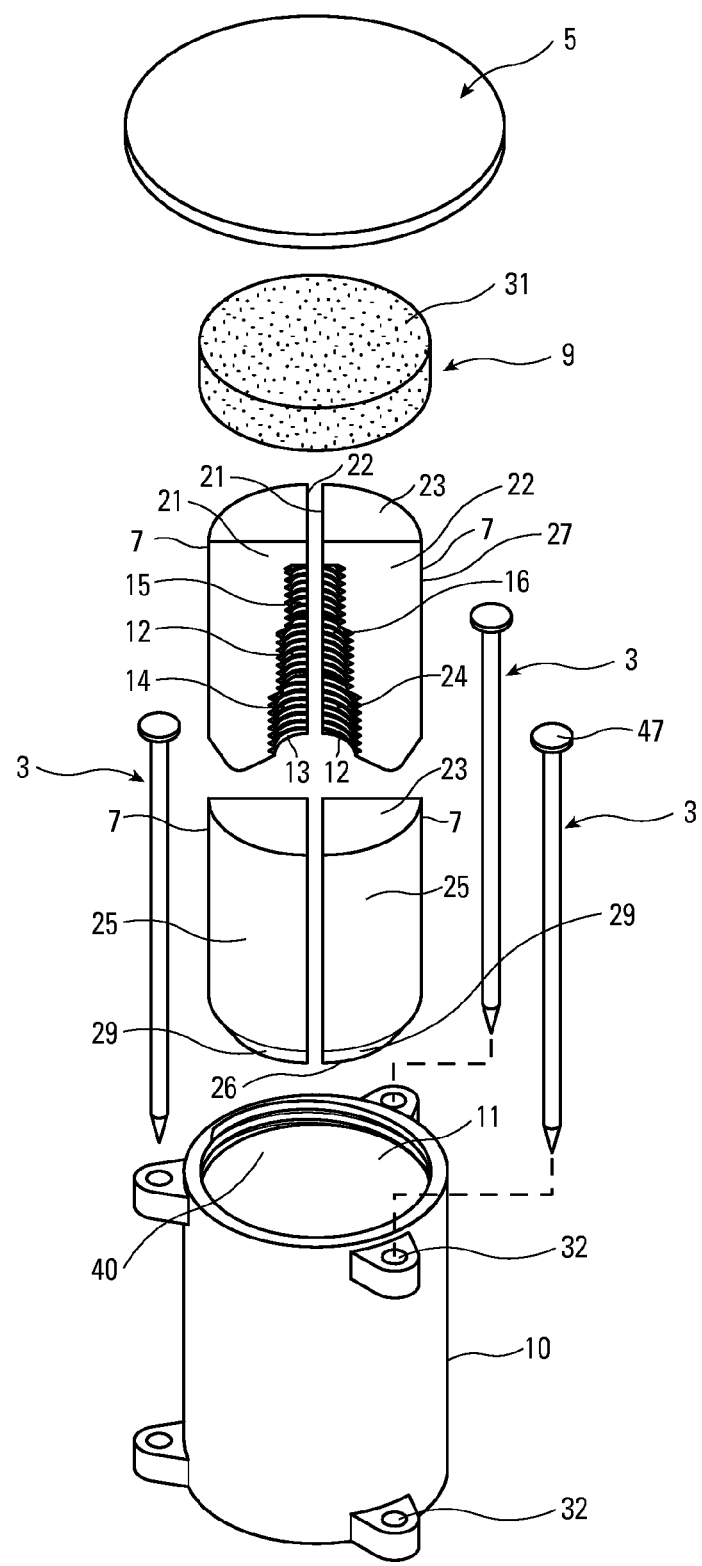
FIG. 2 is an exploded, perspective view of the first, preferred embodiment of the present invention.
Figure 3:
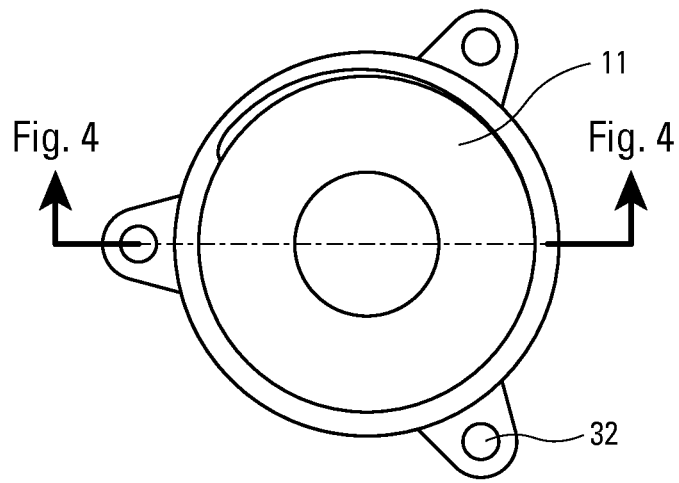
FIG. 3 is a top view of the base of the first, preferred embodiment of the present invention.
Figure 10:
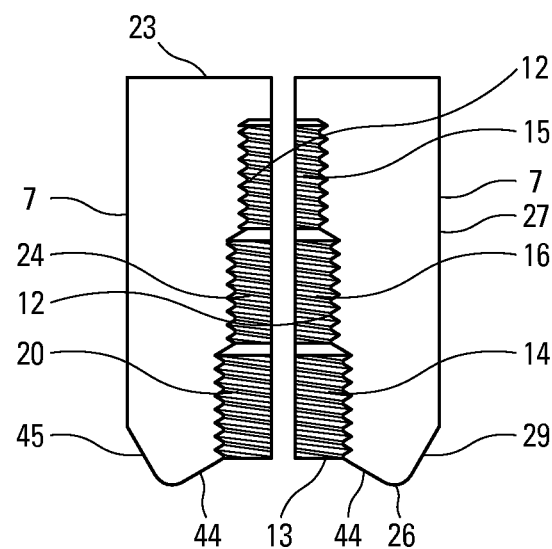
FIG. 10 is a side view of a pair of the inserts of the first, preferred embodiment of the present invention.
Figure 11:
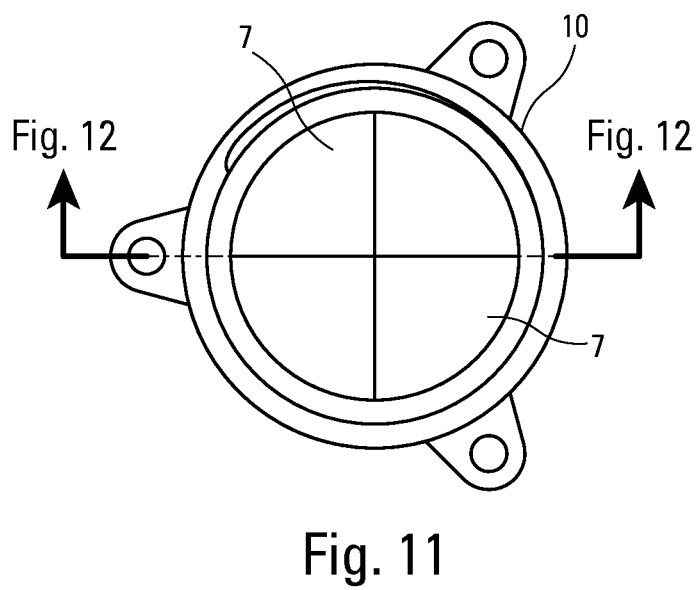
FIG. 11 is a top view of the inserts inserted into the base of the first, preferred embodiment of the present invention.

As shown in FIGS. 2 and 10, the interior receiving bore 8 of the inserts 7 is preferably made with a lower portion 14, having a first selected diameter, an upper portion 15 having a second selected diameter, and a middle portion 16 or portions having differing selected diameters. This allows the concrete anchor to receive threaded rods 4 of differing, selected diameters. Preferably, the lower portion 14 receives the rod 4 with the largest diameter, and the upper portion 15 receives the rod 4 with the smallest diameter.

The inserts 7 are received in the base or housing 10 that contains them by the insert receiving or base bore 11 of the base or housing. The base 10 is preferably a seamless, unitary member. The lower portion 17 of the base bore 11 narrows to cause the inserts 11 to constrict around the threaded rod 4.

The concrete anchor 1 of the present invention preferably has four inserts 7. Greater or lesser numbers of inserts are possible, but four is preferred.

As shown in FIG. 14, the inserts 7 are designed to grasp a preferably vertical tie rod or threaded bolt 4. Preferably, vertical tie rod 4 has threads 18 and is at least threaded where it is grasped by insert segments. Vertical tie rod 4 can be wholly threaded, partially threaded, or unthreaded, although if its unthreaded it is preferable to have grooves 19 on its surface that can mate with similar grooves 20 (shown in FIG. 12) on the inserts 7 for achieving design load values, although alternate methods of grasping the tie rod 4 by the inserts 7 is encompassed within the invention. The inserts 7 preferably surround the tie rod or threaded bolt 4, but with gaps between the inserts 7.

Figure 9:
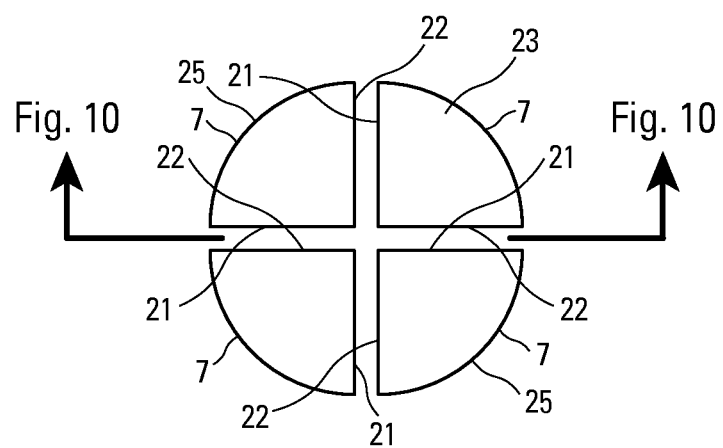
FIG. 9 is a top view of the inserts of the first, preferred embodiment of the present invention.

As shown in FIG. 9, each insert 7 preferably has first and second substantially planar sides 21 and 22 which are preferably perpendicular to the top surface 23. The first and second substantially planar sides 21 and 22 are preferably orthogonal to each other.

As shown in FIG. 2, each insert 7 preferably has a rough, threaded, concave inner bore-defining surface 24 that extends downward from the top or near the top of the insert and connects the first and second substantially planar sides 21 and 22. Preferably, each interior bore-defining surface 24 is primarily a section of a rough, threaded, right circular cylindrical surface that defines the inner bore 8.

As shown in FIG. 9, each insert 7 preferably has a base-bore interfacing surface or outer wall 25 that extends downward from the top surface 23. The base-bore interfacing surfaces 25 preferably taper from the top surface 23 of the inserts to the bottom edge 26 of the insert 7, reducing the cross-section of each insert from the top surface 23 to the bottom edge 26. As shown in FIG. 10, preferably, the general shape of the upper portion 27 of the base-bore interfacing surface 25 of the inserts is collectively that of a cylinder. In one preferred embodiment of the invention shown in FIGS. 16-35, the inserts 7 are formed with tabs 28 splayed circumferentially on the base-bore interfacing surface 25. As shown in FIGS. 10 and 30, the lower portion 29 of the base-bore interfacing surface 25 of the inserts 7 curves or slopes inwardly.

The height of the inserts 7 and the lengths of the threaded portions 12 of the inserts 7 is sufficient to grasp enough of the tie rod or threaded bolt 4 for a secure connection by connecting to multiple turns of the thread or grooves 19 of the rod or bolt 4.

Preferably, the inserts 7 are retained within the base bore 11 by a compression member 9. In one preferred embodiment, the compression member 9 preferably comprises a lower hard washer 30 and an upper soft washer 31. The soft washer 31 is preferably made from a resilient material like rubber that, when compressed, stores energy and expands when compression forces are released. Preferably, the soft washer 31 is made from soft, quick-recovery, super-resilient polyurethane foam. The soft washer 31 functions like a standard metal compression spring and a spring could be used, but the foam washer is preferred. The lower washer 30 is preferably made from steel.

As shown in FIG. 13, the concrete anchor 1 is preferably attached to the wooden form 2 by means of fasteners 3, preferably nails 3 that are inserted through openings 32 in the concrete anchor 1 and driven into the form board 2. The fasteners 3 are preferably angularly spaced around the concrete anchor 1, and are driven by driving the head flange 33 of the concrete anchor 1 which translates the force to the fasteners 3 simultaneously. The fasteners 3 extend downwardly from the lower surface 34 of the head flange 33 in preferably parallel and spaced apart relationship.

In the first preferred embodiment of the present invention, shown in FIGS. 1-15, the base or housing 10 is formed with openings 32 for grasping and holding the fasteners 3, and the bottom 35 of the base or housing 10 is in contact with the top surface 36 of the form board 2 for the concrete member 37.

As shown in FIG. 4, in the first preferred embodiment, the base bore 11 of the housing 10 has a first sliding surface 38 disposed at an angle to the longitudinal axis 39 of the anchor that forms part of the lower portion 17 of the base bore or insert receiving bore 11. This first sliding surface 38 is preferably frusto-conical in shape.

Above the base first sliding surface 38 is an upper housing wall 40 with an angle of ascension much greater than the base first sliding surface 38. This upper housing wall 40 is preferably vertical.

In the first preferred embodiment shown in FIGS. 1-15, inwardly from the first sliding surface 38, the base is formed with a bottom base-bore ledge 41. Inwardly from bottom ledge 41 towards the axis 39 of the anchor 1, a lip 42 is provided with an angled, ascending face 43 towards the longitudinal axis 39 of the anchor. The base-bore ledge 41 and lip 42 stabilize the inserts 7 in the housing which have interior tapering surfaces 44 that correspond to the angle of the lip 42.

In the first preferred embodiment shown in FIGS. 1-15, when the inserts 7 are vertical and sitting at the bottom or as far down in the base bore 11 of the housing as they can go, and in their constricted state, insert first sliding surfaces 45 located at the base of the inserts 7 mate with the housing first sliding surface 38. In the first preferred embodiment, the insert first sliding surface 45 is shorter than the housing first sliding surface 38 (that is to say that they do not extend as far upwardly or away from the longitudinal axis of the anchor 39) and the inserts 7 can travel upwardly along the housing first sliding surface 38.

Above the insert first sliding surface 45, the inserts 7 are formed with insert walls 25 with an angle of ascension much greater than the insert first sliding surface 45. The upper insert walls 25 are preferably vertical. In the first preferred embodiment, when the inserts are vertical and sitting at the bottom of the housing, and in their constricted state, the upper insert walls 25 are located away from the housing upper walls 40.

In the first preferred embodiment, a compression member 9 is preferably located between the inserts 7 and a cap 46 which is attached to the top of the housing or base 10. In the first preferred embodiment the cap 46 is threaded onto the housing 10. The cap 46 is formed with the head flange 33 that extend over the heads 47 of the fasteners 3. The fastener heads 47 are in contact with the bottom 48 of the cap to translate driving forces applied to the top 49 of the cap 46 to the fasteners 3. The fasteners 3 are formed with pointed tips 50 for making it easier to drive the fasteners 3 into the form 2. Aligned tabs 51 at the base and near the top of the housing 10 hold the fasteners 3 to the housing 10.

Figure 19:
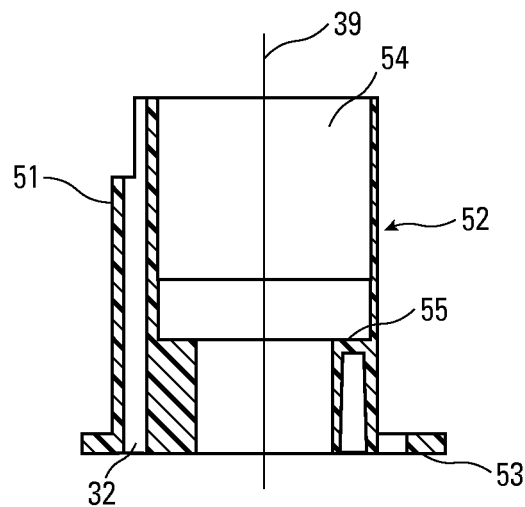
FIG. 19 is a sectional side view of the holder of the second, preferred embodiment of the present invention.
Figure 20:
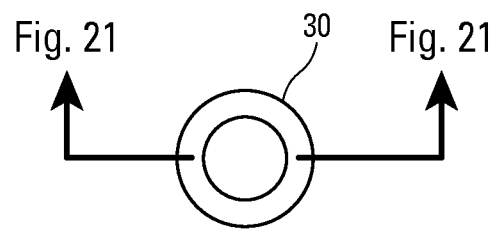
FIG. 20 is a top view of a washer of the second, preferred embodiment of the present invention.
Figure 21:
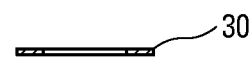
FIG. 21 is a sectional, side view of the washer of the second, preferred embodiment of the present invention.
Figure 22:
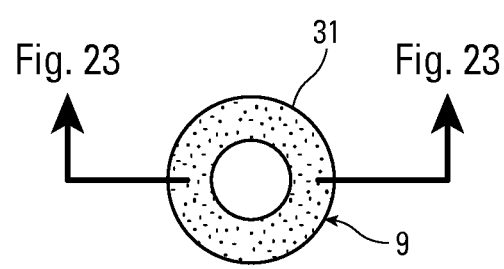
FIG. 22 is a top view of the compression spring of a first, preferred embodiment of the present invention.
Figure 23:
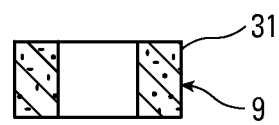
FIG. 23 is a sectional, side view of the compression spring of a first, preferred embodiment of the present invention.
Figure 24:
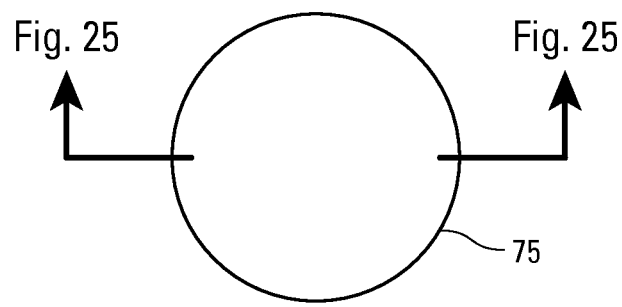
FIG. 24 is a top view of the plate used with the cap of the second, preferred embodiment of the present invention.
Figure 25:
FIG. 25 is a sectional side view of the plate used with the cap of the second, preferred embodiment of the present invention.
Figure 26:
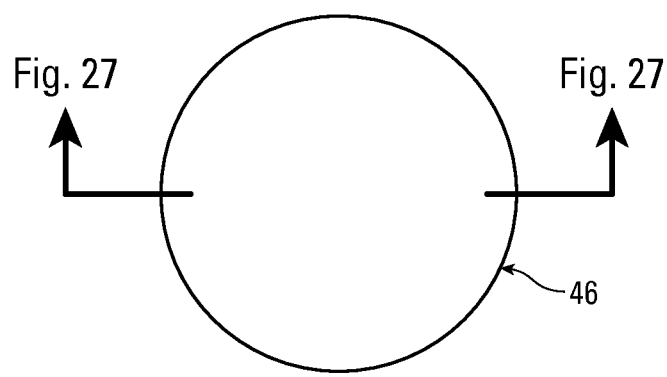
FIG. 26 is a top view of the cap of the second, preferred embodiment of the present invention.
Figure 27:
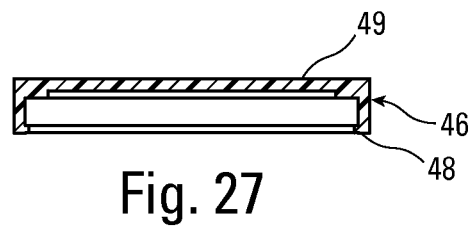
FIG. 27 is a sectional, side view of the cap of the second, preferred embodiment of the present invention.

In the second preferred embodiment of the present invention, shown in FIGS. 16-35, the base 10 is received by a holder 52. As best shown in FIG. 19, the holder 52 is formed with openings 32 for grasping and holding the fasteners 3, and the bottom 53 of the holder is in contact with the form board 2 for the concrete form 2. The holder 52 separates the base 10 from the top surface 36 of the form board 2. The holder 52 is formed with a base receiving bore 54 that has a base receiving ledge or shoulder 55 substantially above the bottom of the holder 53. The bottom of the base 35 interfaces with the shoulder 55 in the base receiving bore 54. The holder 52 can be made from plastic which is much cheaper to manufacture than the base 10 which needs to be sufficiently strong to resist the outward pressure generated by the inserts 7 when a tension load is applied to the threaded rod 4 received in the anchor 1. With the use of the holder 52, the base 10 can be made shorter and from less material, thus reducing its cost of manufacture. The base receiving bore 54 of the holder is shaped so that the base 10 when inserted into the holder 52 with the bottom of the base 35 touching the shoulder of the holder 55, the base 35 protrudes slightly above and beyond the top of the holder 52. The base receiving bore 54 of the holder 52 is shaped to create a close friction fit between the holder 52 and the base 10.

In the second preferred embodiment, the insert receiving bore or base bore 11 of the housing 10 has a first sliding surface 38 disposed at an angle to the longitudinal axis of the anchor 39. This first sliding surface 38 is preferably frusto-conical in shape, but it could also be frusto-spherical.

Above the base first sliding surface 38 is a middle housing wall 56 with an angle of ascension much greater than the base bore first sliding surface 38. This middle housing wall 56 is preferably vertical. The middle housing wall 56 extends upwardly for only a short distance, until it reaches a shoulder 57 which has an angle of ascension that is less than the middle housing wall 56. The shoulder 57 is preferably an annular ledge 58 that is orthogonal to the longitudinal, central axis 39 of the anchor 1. Above the annular ledge 58 an upper housing wall 40 extends at an angle of ascension much greater than the first sliding surface 38 of the base 10. This upper housing wall 40 is preferably vertical. The middle housing wall 56 is preferably cylindrical in shape and has a diameter large enough to contain the lower portions of the inserts 7 in their constricted position.

In the second preferred embodiment, below the base first sliding surface 38, the wall of the base-bore 11 descends at an angle of descent that is greater than the angle of base first sliding surface 38. This angle is preferably vertical or aligned with the axis of the anchor, creating a lower housing wall 59.

In the second preferred embodiment, when the inserts 7 are vertical and sitting at the bottom of the housing 10, and in their constricted state, insert first sliding surfaces 45 located at the base of the inserts 7 contact the base first sliding surface 38. In the second preferred embodiment, the insert first sliding surface 45 can travel upwardly along the base first sliding surface 38. In the second preferred embodiment, the insert first sliding surface 45 is frusto-spherical and in contact with the housing or base first sliding surface 38 which is frusto-conical. The lower portions of the inserts 7 collectively have the geometry of a spherical segment—a spherical cap with the top truncated, or a spherical frustum. The inserts 7 are inserted in the base bore 11 of the housing 10. The lower sliding surfaces 45 of the insert segments 7 are able to rotate or swing to be in contact with the first sliding surface 38 of the base 10 due to their rounded profile.

Above the insert first sliding surface 45, the inserts are formed with insert walls with an angle of ascension much greater than the insert first sliding surface 45. The upper insert walls 25 are preferably vertical. In the first preferred embodiment, when the inserts 7 are vertical and sitting at the bottom of the housing 35, and in their constricted state, the upper insert walls 25 are located away from the upper walls of the housing 40 and in contact with the middle wall 56 of the housing or base 10.

Figure 28:
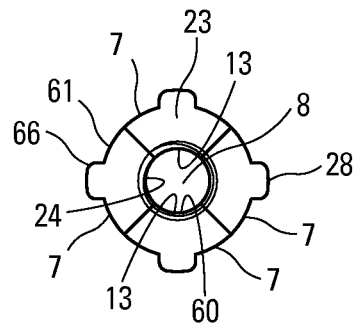
FIG. 28 is a top view of the inserts of the second, preferred embodiment of the present invention.
Figure 29:
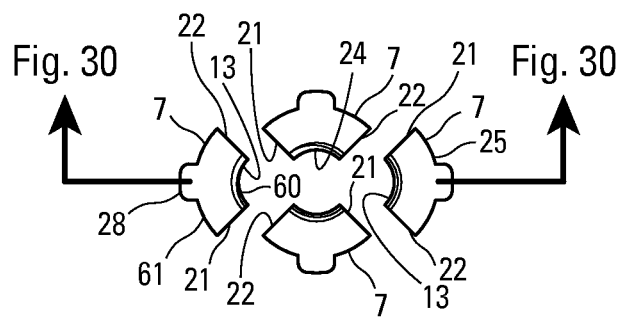
FIG. 29 is an exploded, top view of the inserts of the second, preferred embodiment of the present invention.
Figure 30:
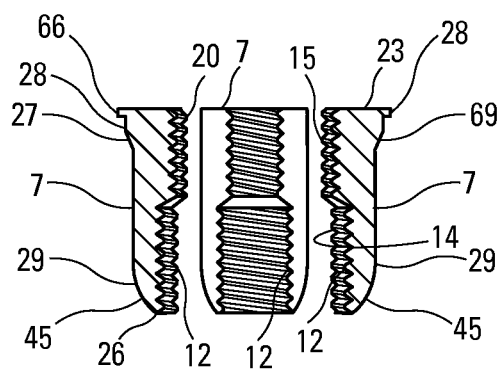
FIG. 30 is a sectional, side view of the inserts of the second, preferred embodiment of the present invention.
Figure 31:
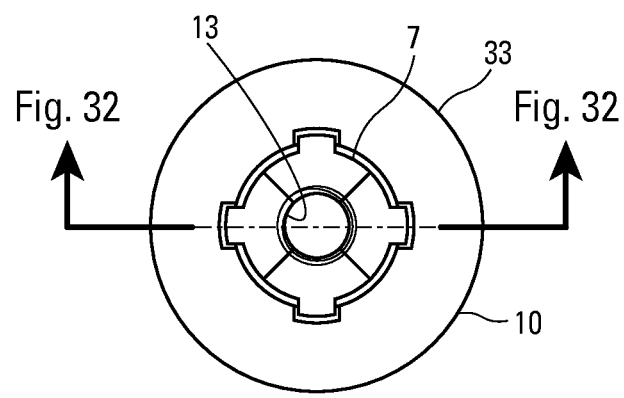
FIG. 31 is a top view of the inserts inserted into the base of the second, preferred embodiment of the present invention.
Figure 32:
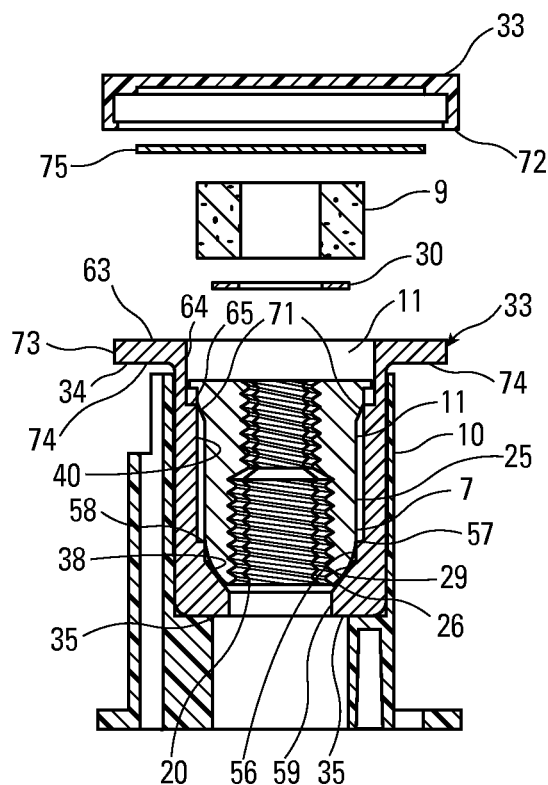
FIG. 32 is a partial, exploded sectional, side view of the second, preferred embodiment of the present invention.
Figure 33:
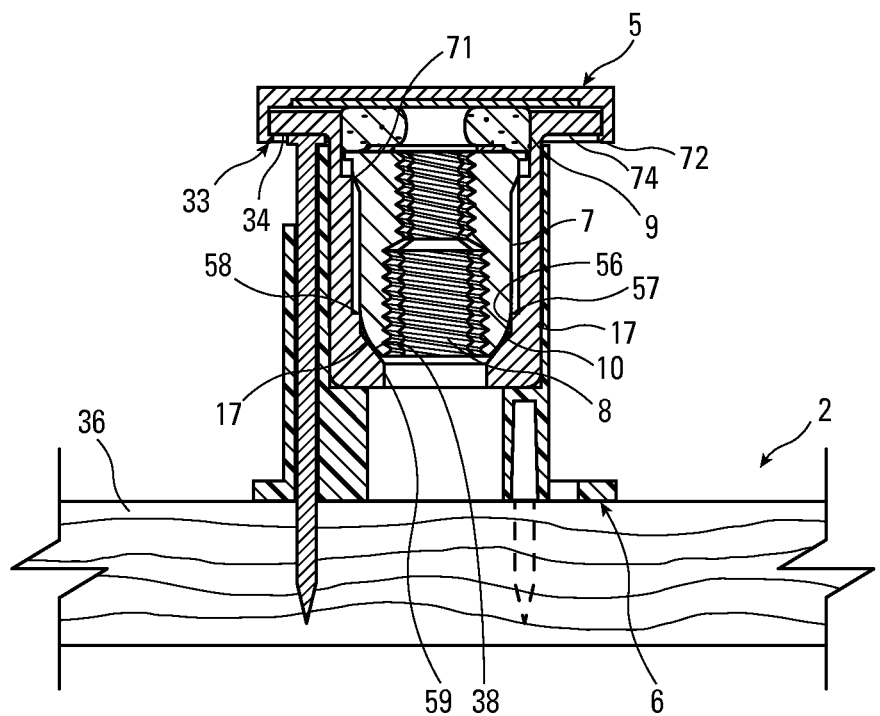
FIG. 33 is sectional, side view of the second, preferred embodiment of the present invention attached to a wood form.
Figure 34:
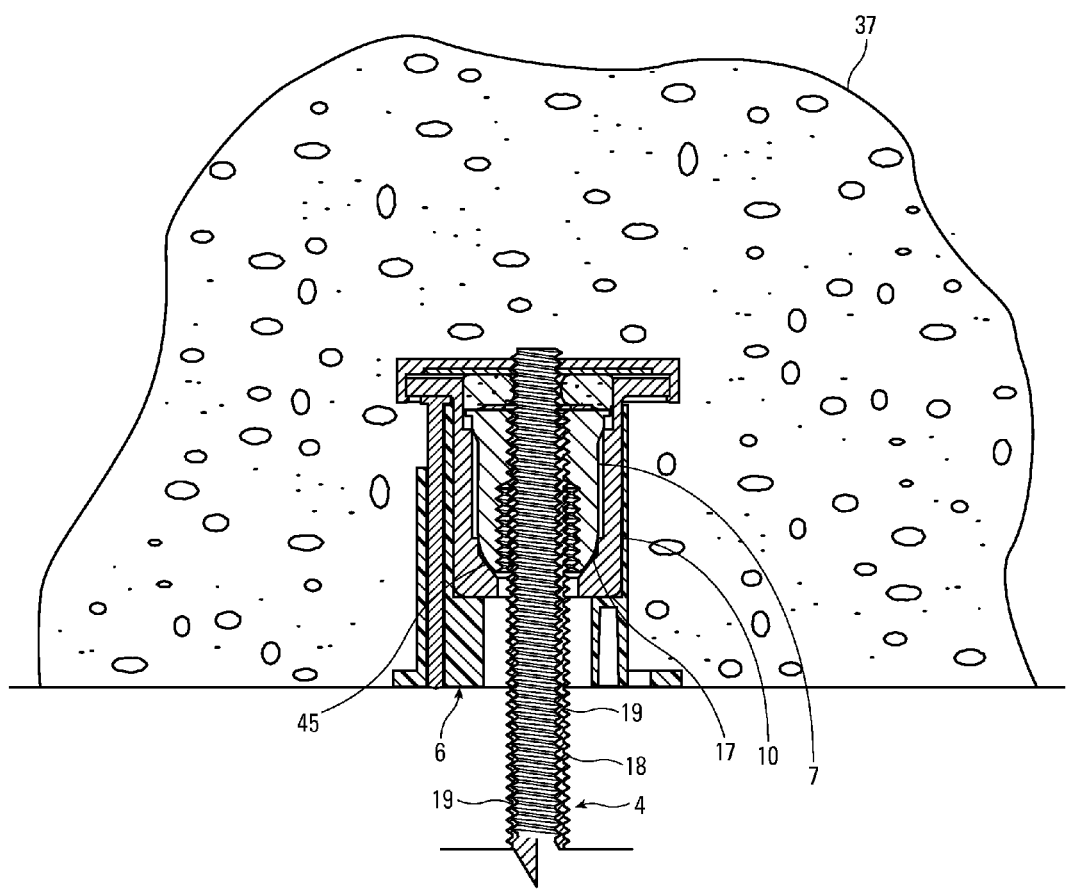
FIG. 34 is a sectional, side view of the second, preferred embodiment of the present invention installed in a concrete form with the form board removed and a threaded rod inserted into the concrete anchor.
Figure 35:
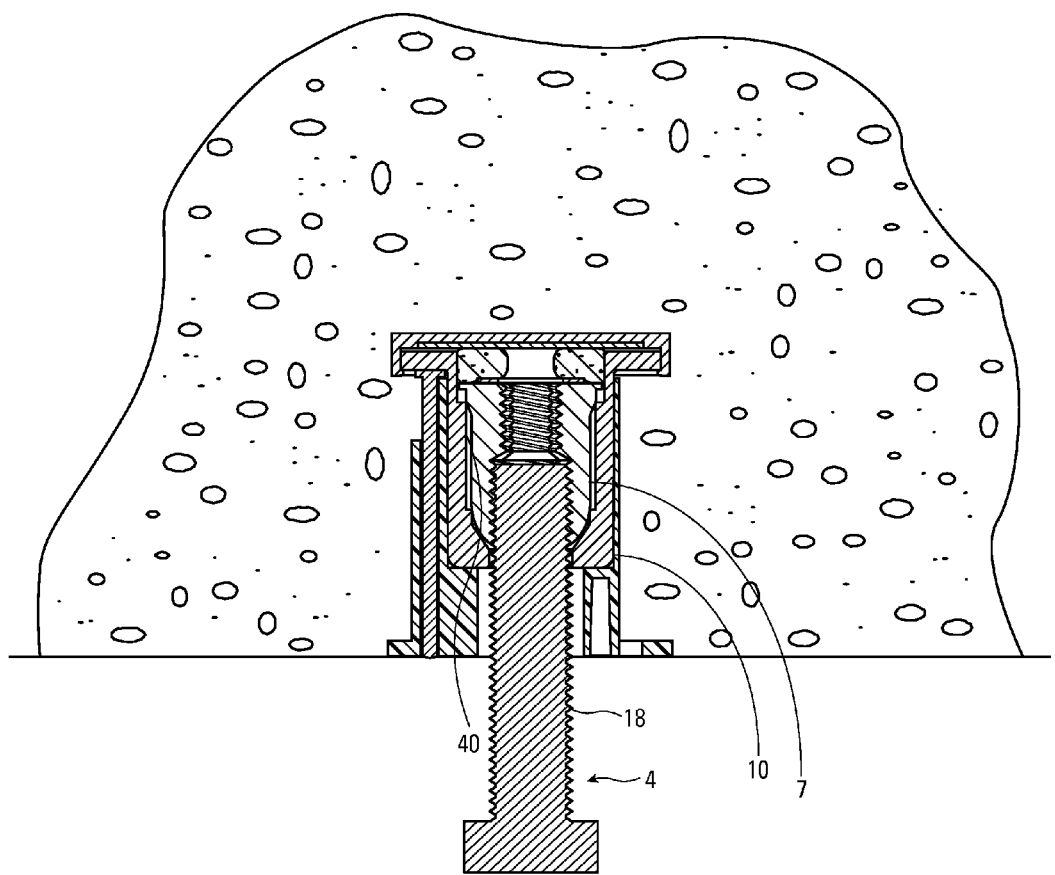
FIG. 35 is a sectional, side view of the second, preferred embodiment of the present invention installed in a concrete form with the form board removed and a threaded rod of differing diameter than the threaded rod shown in FIG. 34 inserted into the concrete anchor.

As shown in FIGS. 28-30, the inserts 7 are generally formed with an inner bore defining arc 60 and an outer wall defining arc 61. The outer wall defining arc 61 of each insert in the second preferred embodiment is preferably interrupted by an insert tab 28 that projects from the convex outer wall defining arc or edge 61. The insert tab 28 is preferably formed as an integral part of the insert 7, rather than as a separate part attached to the insert 7. The insert tab 28 extends only partially down the outer wall 25 of the insert 7.

In the second preferred embodiment, the base has a top edge 63. The top edge is preferably flat. The top edge 63 of the housing 10 and portions of the upper wall 40 are notched with a number of indentions 64 that closely match the tabs 28 on the inserts. The notches 64 extend downwardly to the notch ledges 65. Each tab preferably fits in an indentation 64, but does not extend outside the housing 10. The interlock between the insert tabs 28 and the indentations 64 prevents the inserts from rotating around the central axis 39. The interface between the tabs 28 and the indentations 64 also help to stabilize the inserts 7, helping to keep them level especially when a threaded rod 4 is inserted into the inner bore 24.

The preferred embodiment of the insert tab 28 has a multiple stepped profile. The upper portion 66 of the insert tab 28 extends sufficiently away from the insert upper wall 25 to be received in the notch or indentation 64 of the upper wall 40 of the base 10 when the inserts are in their constricted orientation resting at the base of the housing 10. A middle portion 67 of the insert tab 28 extends away from the insert upper wall 25 less than the upper portion of the insert tab 28. The middle portion 67 extends sufficiently away from the upper wall 25 of the insert 7 that when the inserts 7 are in their constricted orientation or state the outer surface 68 of the middle portion 67 of the tab 28 interfaces with the upper wall surface 40 of the base 10 below the notch 64. The insert tabs 7 are also formed with a lower portion 69 that angles towards the upper wall 25 of the insert 7 until the tab reaches the upper wall 25, creating a ramped surface 70. The ramped surface 70 of the lower portion 69 of the insert tab 28 is preferably planar. This represents the lower extent of the insert tab 28. The insert tabs 28 are able to at least partially fit in the notches 64 in the wall of the housing 10. The insert tabs 28 have a circumferential extent or width that is less than the circumferential extent of the notches 64 or indentations in the base 10.

The inserts 7 are formed so that when a threaded rod 4 is inserted into the anchor 1 and pushes the inserts 7 upwardly, the outer wall or surface 68 of the middle portion 67 of the insert tabs 28 can be received in the notches 64 in the housing above the ledge 65, and the outer wall or surface 70 of the lower portion of the insert tab 69 can contact the edge 71 of the ledge 65 of the housing notch 64 where it interfaces with the upper wall 40 of the housing 10. The upper portions 66 of the insert tabs 28 extend sufficiently toward the housing wall 40 such that the upper portions 66 of the tabs 28 are received in the notch 64 when the inserts 7 are in their constricted state and resting at the base of the housing 10, but the upper portions of the tab 66 are spaced sufficiently from the housing 10 that when the inserts 7 are pushed upwardly and tipped or translated outwardly the upper portions 66 of the insert tabs 7 can be inserted further into the notches 64.

In the second preferred embodiment, a compression member 9 is preferably located between the inserts 7 and cap 46 which is attached to the top of the housing or base 10. In the second preferred embodiment the cap 46 is formed with an annular descending, shouldered flange 72 that can clamp onto the annular flange 73 of the base 10. The cap 46 is so large that it extends over the heads of the fasteners 47. The fastener heads 47 are in contact with the bottom of the flange 74 of the base 10 to translate driving forces applied to the top of the cap 49 which rests on the flange 74 of the base 10 to the fasteners 3. The fasteners 3 are formed with pointed tips 50 for making it easier to drive them into the form 2. Bosses and tabs 51 in the holder 52 hold the fasteners 51 to the housing. The cap 46 receives a plate 75 made of metal that helps to translate the force exerted on the cap 46 to the head flange 33 of the base 10. The cap 46 is preferably made of plastic.

The first sliding surfaces 38 of the housing are preferably set at the same angle as the thread angle of the rod 4.

In the preferred embodiments, the inserts 7 are made with flat tops 23 and in one preferred embodiment are compressed by a member 9 with a flat surface so that it allows the tie rods 4 to be inserted with a minimal risk of jamming the take-up device 1 because the inserts 7 are held in place by a flat, hard washer 30 above, which interfaces with the flat surfaces 23 at the top of the inserts 7 to stabilize them as they expand away from and constrict towards the central vertical axis 39 of the anchor 1.

The top surface 23 of the inserts 7 need not be planar, but it is generally advantageous to maximize the area of the top surface 23 because the top surface 23 is where the inserts are pushed down by compression member 9 which helps to prevent the inserts 7 from rotating too far out of their upright orientation when the tie rod 4 pushes them upwardly and outwardly when it is installed, and thus the inserts 7 are appropriately positioned to grasp the tie rod 4 as firmly as possible when the tie rod 4 is in tension.

In use, the concrete anchor 1 is placed on a form 2 at a selected position, and then the top 5 of anchor 1 is hammered to drive the fasteners 3 into the form 2 until the bottom 6 of the anchor 1 bears against the top surface 36 of the form 2. Concrete 37 is then cast around the concrete anchor 1. The hardened concrete cast around the anchor 1 can be considered a first structural member to which the rod 4 is connected by means of the anchor 1. After the concrete 37 has hardened, the form 2 is removed. Thereupon, the interior bore 24 is exposed through the concrete slab 37 as well as the bottom 35 of the housing or base 10. The housing or base 10 can be colored to indicate the size or sizes of rods 4 that can be received by the concrete anchor 1. The portions of the fasteners 3 which project beyond the bottom 35 of the base or housing 10 should be cut off to prevent them from being a hazard. A suspension bolt or threaded rod 4 can be then inserted into and grasped by the concrete anchor 1, and various building members can be suspended from the threaded rod 4.

I claim:

1. A connection between a rod, an anchor, and a first structural member, the connection comprising:
   a. the first structural member;
   b. the rod; and
   c. the anchor, connecting the first structural member to the rod, the anchor including a housing, the housing having a bottom, a top and a longitudinal central axis extending through the bottom and the top, the housing having an insert receiving bore that opens through the bottom of the housing, the insert receiving bore having a narrowing lower portion closer to the bottom than the top of the housing; and wherein a plurality of inserts are disposed in the insert receiving bore and contained securely within the housing, each of the inserts has a base bore interfacing surface that interfaces with the narrowing lower portion of the insert receiving bore of the housing, wherein each insert has a concave inner surface and the plurality of concave inner surfaces form a generally tubular interior rod receiving bore that receives a portion of the rod, and the inserts are sized with respect to the housing such that when the rod is received in the interior rod receiving bore and engages the inserts and moves toward the bottom of the housing, the inserts will be pulled toward the bottom of the housing, and the narrowing in the lower portion of the insert receiving bore causes a constriction of the inserts about the rod forcing them to grasp and hold the rod, and when the rod is inserted into the interior rod receiving bore and moves toward the top of the housing, the inserts can be moved away from each other and from the longitudinal, central axis of the housing, allowing the rod to be inserted farther into the housing and towards the top of the housing; and wherein
   d. the housing is formed with a bottom base-bore ledge that is part of the insert receiving bore and is closer to the bottom of the housing than the narrowing lower portion of the insert receiving bore; and inwardly from the base-bore bottom ledge towards the longitudinal, central axis of the housing a lip is provided that ascends toward the top of the housing.

2. The connection of claim 1, wherein:
the lip is formed with an angled face as the lip ascends towards the longitudinal, central axis of the housing and the top of the housing.

3. The connection of claim 2, wherein:
the inserts received in the housing have interior tapering surfaces that correspond to the angled face of the lip.

4. A connection between a rod, an anchor, and a first structural member, the connection comprising:
   a. the first structural member;
   b. the rod; and
   c. the anchor, connecting the first structural member to the rod, the anchor including a housing, the housing having a bottom, a top and a longitudinal central axis extending through the bottom and the top, the housing having an insert receiving bore that opens through the bottom of the housing, the insert receiving bore having a narrowing lower portion closer to the bottom than the top of the housing; and wherein a plurality of inserts are disposed in the insert receiving bore and contained securely within the housing, each of the inserts has a base bore interfacing surface that interfaces with the narrowing lower portion of the insert receiving bore of the housing, wherein each insert has a concave inner surface and the plurality of concave inner surfaces form a generally tubular interior rod receiving bore that receives a portion of the rod, and the inserts are sized with respect to the housing such that when the rod is received in the interior rod receiving bore and engages the inserts and moves toward the bottom of the housing, the inserts will be pulled toward the bottom of the housing, and the narrowing in the lower portion of the insert receiving bore causes a constriction of the inserts about the rod forcing them to grasp and hold the rod, and when the rod is inserted into the interior rod receiving bore and moves toward the top of the housing, the inserts can be moved away from each other and from the longitudinal, central axis of the housing, allowing the rod to be inserted farther into the housing and towards the top of the housing; and wherein d. the lower portion of the insert receiving bore of the housing has a base-bore first sliding surface disposed at an angle to the longitudinal, central axis of the anchor, and above the base-bore first sliding surface, closer to the top of the anchor is a middle housing wall with an angle of ascension much greater than the base-bore first sliding surface, the middle housing wall extends towards the top of the anchor to a shoulder which has a lower angle of ascension than the middle housing wall, and above the shoulder, closer to the top of the anchor is an upper housing wall that extends at an angle of ascension much greater than the base-bore first sliding surface.

5. The connection of claim 4, wherein:
a. the inserts are formed with lower portions where the shape of the base bore interfacing surface causes the insert to taper to a bottom edge of the insert; and
b. the middle housing wall has a diameter large enough to contain the lower portions of the inserts when there is a constriction of the inserts about the rod and the inserts grasp and hold the rod.

6. The connection of claim 5, wherein:
the middle housing wall is preferably aligned with the longitudinal, central axis.

7. The connection of claim 6, wherein:
the upper housing wall is preferably aligned with the longitudinal, central axis.

8. The connection of claim 6, wherein:
the middle housing wall is cylindrical.

9. The connection of claim 5, wherein:
a. the base-bore first sliding surface is preferably frusto-conical in shape; and
b. the base bore interfacing surface is frusto-spherical where the base bore interfacing surface makes contact with the base-bore first sliding surface.

10. The connection of claim 9, wherein:
the middle housing wall is preferably aligned with the longitudinal, central axis.

11. The connection of claim 9, wherein:
the upper housing wall is preferably aligned with the longitudinal, central axis.

12. The connection of claim 4, wherein:
a. one or more of the inserts are formed with a tab on the base bore interfacing surface, and the tab extends only partially down the base bore interfacing surface; and wherein:
b. the base bore interfacing surface descends from a top surface of the inserts and tapers to a bottom edge of the insert;
c. the insert receiving bore is formed with one or more notches terminating at ledges where the notches are closest to the bottom of the housing; and
d. the one or more tabs of the inserts interface with and are at least partially received by each of the one or more notches.

13. The connection of claim 4 wherein:
the first structural member is a hardened concrete member, and the anchor is embedded in the hardened concrete member.

14. A method of forming the connection of claim 4 comprising the steps of:
a. embedding the anchor in the first structural member; and
b. inserting the rod into the interior rod receiving bore of the anchor.

15. A connection between a rod, an anchor, and a first structural member, the connection comprising:
a. the first structural member;
b. the rod; and
c. the anchor, connecting the first structural member to the rod, the anchor including a housing, the housing having a bottom, a top and a longitudinal central axis extending through the bottom and the top, the housing having an insert receiving bore that opens through the bottom of the housing, the insert receiving bore having a narrowing lower portion closer to the bottom than the top of the housing; and wherein a plurality of inserts are disposed in the insert receiving bore and contained securely within the housing, each of the inserts has a base bore interfacing surface that interfaces with the narrowing lower portion of the insert receiving bore of the housing, wherein each insert has a concave inner surface and the plurality of concave inner surfaces form a generally tubular interior rod receiving bore that receives a portion of the rod, and the inserts are sized with respect to the housing such that when the rod is received in the interior rod receiving bore and engages the inserts and moves toward the bottom of the housing, the inserts will be pulled toward the bottom of the housing, and the narrowing in the lower portion of the insert receiving bore causes a constriction of the inserts about the rod forcing them to grasp and hold the rod, and when the rod is inserted into the interior rod receiving bore and moves toward the top of the housing, the inserts can be moved away from each other and from the longitudinal, central axis of the housing, allowing the rod to be inserted farther into the housing and towards the top of the housing; and wherein
d. one or more of the inserts are formed with a tab on the base bore interfacing surface, and the tab extends only partially down the base bore interfacing surface; and wherein:
e. the base bore interfacing surface descends from a top surface of the inserts and tapers to a bottom edge of the insert;
f. the insert receiving bore is formed with one or more notches terminating at ledges where the notches are closest to the bottom of the housing; and
g. the one or more tabs of the inserts interface with and are at least partially received by each of the one or more notches.

16. The connection of claim 15, wherein:
a. the tabs on the one or more inserts have an upper portion that extends sufficiently away from the base bore interfacing surface to be received in the corresponding notch of the base when the inserts are resting at the base of the housing grasping the rod, and
b. the tabs also have a middle portion that extends away from the base bore interfacing surface less than the upper portion of the tab while extending sufficiently away from the base bore interfacing surface that when the inserts rest on the bottom of the base and grasp a rod an outer surface of the middle portion of the tab interfaces with the insert receiving bore.

17. The connection of claim 16, wherein:
a. the tabs are each formed with a lower portion set at an angle to the longitudinal, central axis, creating a ramped surface;
b. the inserts are formed so that when a threaded rod is inserted into the anchor and pushes the inserts upwardly and outwardly, the outer surface of the middle portion of the one or more tabs can be received in the one or more notches in the housing, and the ramped surfaces of the lower portions of the one or more tabs can contact an edge of the ledges of the notches; and c. the upper portions of the tabs are spaced sufficiently from the housing that when the inserts are pushed upwardly and tipped or translated outwardly by the rod the upper portions of the one or more tabs can be inserted further into the one or more notches.

18. The connection of claim 16, wherein:

the ramped surface of the lower portion of the insert tab is preferably planar.

19. The connection of claim 15, wherein:

the interior rod receiving bore is formed with multiple diameters such that anchors of different diameters can be receive by the inserts.

* * * * *